United States Patent
Baldua et al.

(10) Patent No.: US 12,298,975 B2
(45) Date of Patent: May 13, 2025

(54) DYNAMIC QUERY PLANNING AND EXECUTION

(71) Applicant: Microsoft Technology Licensing, LLC, Redmond, WA (US)

(72) Inventors: Manish R. Baldua, San Jose, CA (US); Daniel K. Hewlett, Clarksville, MD (US); Gregory E. Pounds, San Jose, CA (US); Xie Lu, Sunnyvale, CA (US); Jonathan Pohl, Concord, MA (US); Peter Rigano, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/429,219

(22) Filed: Jan. 31, 2024

(65) Prior Publication Data

US 2025/0110957 A1    Apr. 3, 2025

Related U.S. Application Data

(60) Provisional application No. 63/587,393, filed on Oct. 2, 2023.

(51) Int. Cl.
   *G06F 16/2453* (2019.01)
   *G06F 16/242* (2019.01)

(52) U.S. Cl.
   CPC .... *G06F 16/24542* (2019.01); *G06F 16/2425* (2019.01); *G06F 16/243* (2019.01)

(58) Field of Classification Search
   CPC ........... G06F 16/24542; G06F 16/2425; G06F 16/243
   See application file for complete search history.

(56) References Cited

U.S. PATENT DOCUMENTS

| | | | |
|---|---|---|---|
| 2021/0089548 A1* | 3/2021 | Lim | G06F 16/335 |
| 2024/0028605 A1* | 1/2024 | Oswal | G06F 11/3409 |
| 2024/0411755 A1* | 12/2024 | Vijayan | G06F 16/24522 |

OTHER PUBLICATIONS

International Search Report and Written Opinion received for PCT Application No. PCT/US2024/047345, Dec. 5, 2024, 17 Pages.
Marwah et al., "Can Generative LLMs Create Query Variants for Test Collections? An Exploratory Study", Proceedings of The 2023 Chi Conference On Human Factors in Computing Systems, Jul. 19, 2023, 5 pages.

(Continued)

*Primary Examiner* — Cam Y T Truong
(74) *Attorney, Agent, or Firm* — Nicholson De Vos Webster & Elliott LLP

(57) ABSTRACT

Embodiments of the disclosed technologies include receiving a first query including at least one first query term and configuring at least one prompt to cause a large language model to translate the at least one first query term into a set of functions that can be executed to obtain at least one second query term and generate and output a plan that is executable to create a modified version of the first query based on the at least one second query term. The plan is obtained by applying the large language model to the at least one prompt as configured. The plan is executed to determine the at least one second query term and create the modified version of the first query. The modified version of the first query is executed to provide, via the user interface, a response to the first query.

19 Claims, 11 Drawing Sheets

(56) References Cited

OTHER PUBLICATIONS

Zhu et al., "Furthest Reasoning with Plan Assessment: Stable Reasoning Path with Retrieval-Augmented Large Language Models", Sep. 22, 2023, 16 pages.

Greyling, Cobus, "Prompt Chaining & Large Language Models", Retrieved from the URL: https://cobusgreyling.medium.com/prompt-chaining-large-language-models-a7c9b66eb5f9, Apr. 4, 2023, 20 Pages.

Greyling, Cobus, "Prompt Engineering, OpenAI & Modes", Retrieved from the URL: https://cobusgreyling.medium.com/prompt-engineering-openai-modes-597425540eae, Mar. 17, 2023, 20 Pages.

Jagerman, et al., "Query Expansion by Prompting Large Language Models", arXiv preprint arXiv:2305.03653, May 5, 2023, 7 Pages.

\* cited by examiner

Receive, via a user interface of an application, a first query that includes a user request for information retrievable using a first set of data resources, where the first query includes at least one first query term.
752

---

Configure at least one prompt to cause a large language model to translate the at least one first query term into a set of functions that can be executed to obtain at least one second query term using a second set of data resources, and generate and output a plan that is executable to create a modified version of the first query based on the at least one second query term.
754

---

Apply the large language model to the at least one prompt to obtain the plan.
756

---

Execute the plan generated and output by the large language model to determine the at least one second query term, and create the modified version of the first query based on the at least one second query term.
758

---

Execute the modified version of the first query based on the at least one second query term to provide, via the user interface, a response to the first query.
760

DYNAMIC QUERY PLANNING AND EXECUTION

CROSS-REFERENCE TO RELATED APPLICATION

The present application claims the benefit under 35 U.S.C. § 119 (e) of U.S. Provisional Patent Application Ser. No. 63/587,393 filed Oct. 2, 2023, which is incorporated herein by this reference in its entirety.

TECHNICAL FIELD

A technical field to which this disclosure relates includes query planning for information retrieval systems.

COPYRIGHT NOTICE

This patent document, including the accompanying drawings, contains material that is subject to copyright protection. The copyright owner has no objection to the facsimile reproduction of this patent document, as it appears in the publicly accessible records of the United States Patent and Trademark Office, consistent with the fair use principles of the United States copyright laws, but otherwise reserves all copyright rights whatsoever.

BACKGROUND

A content distribution system is a computer system that is designed to distribute information, such as posts, articles, videos, images, web pages, user profiles, and job postings, to computing devices for viewing and interaction by users of those devices. Examples of content distribution systems include news feeds, social network services, messaging systems, and search engines. An information retrieval system retrieves stored content in response to queries. A chatbot (or chat bot) is a software application that can retrieve content and answer questions by simulating a natural language conversation with a human user.

BRIEF DESCRIPTION OF THE DRAWINGS

The disclosure will be understood more fully from the detailed description given below and from the accompanying drawings of various embodiments of the disclosure. The drawings are for explanation and understanding only and should not be taken to limit the disclosure to the specific embodiments shown.

FIG. 5A illustrates an example of at least one user interface flow including a screen capture of a user interface screen for information retrieval using components of a dynamic query planning system in accordance with some embodiments of the present disclosure.

FIG. 5B illustrates an example of at least one user interface flow including a screen capture of a user interface screen for information retrieval using components of a dynamic query planning system in accordance with some embodiments of the present disclosure.

FIG. 7B is a flow diagram of an example method for dynamic query planning using components of a dynamic query planning system in accordance with some embodiments of the present disclosure.

DETAILED DESCRIPTION

Figure 1A:
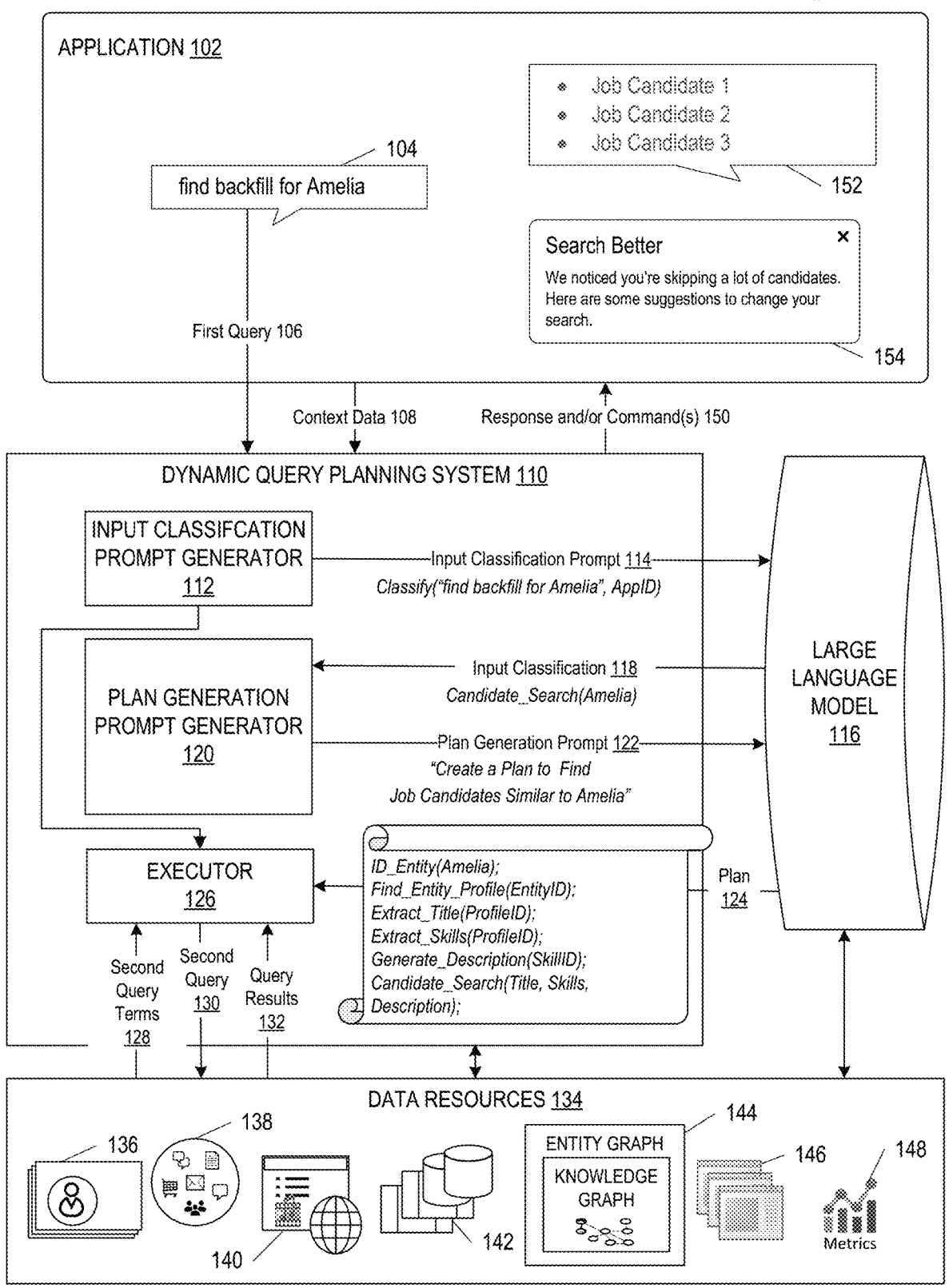
FIG. 1A is a flow diagram of an example method for dynamic query planning using components of a dynamic query planning system in accordance with some embodiments of the present disclosure.

Computer systems commonly employ facets and filters to facilitate information retrieval. Filters can be applied during query execution to limit the number of search results that are retrieved. For example, in a search for job candidates, filtering criteria such as geographic location and job title can reduce the size of a result set to profiles of only those candidates who reside in a particular location or have a particular job title in their work history. When filters are applied, typically, the filtered result set is presented to the user instead of the unfiltered set. Thus, filters can help remove irrelevant or unwanted items from the result set. However, if filters are not carefully designed, they can overly restrict the result set, such that relevant or desired items are not presented to the user, sometimes returning no results at all. On the other hand, poorly designed filters can cause the result set to be overinclusive such that many irrelevant items are presented to the user.

Facets can be applied during query execution to group the items in a result set according to specific categories or attributes and their associated values. For example, if a query specifies a particular job title, then during query execution the results may be grouped by facets such as geographic location, years of experience, and skills. A common way to present facets to the user is to indicate the count of search results that correspond to each facet and facet value; for example: "Location|Bay Area: 100; Greater New York City: 95; Austin, Texas: 85; Experience|10+ years' experience: 30; 1-5 years' experience: 200; Skills|Java: 230; Machine Learning: 175," where, in each case, word before the "|" indicates the facet, the words after the "|" indicate the respective facet values found in the search results, and the numerical value indicates the number of items having the respective facet value.

With facets, the categorical groupings and counts of the number of items in each grouping are determined after a search has been executed and before or while the search results are being presented to the user. Also, the facets are not necessarily mutually exclusive. That is, the same search result can be grouped into multiple different facets. For example, a Java programmer in Austin with 4 years of experience can be grouped under the following facets: location=Austin, Texas, skill=Java, and work experience=1-5 years.

Traditionally, facets are presented to the user as a set of selectable items such as check boxes, list items, or selectable button-shaped graphics. Typically, the facets are designed to be toggled. This allows users to turn facets on and off to see how the result set changes. As such, facets can provide users with a more explorative or free-flowing search experience that enables the discovery of information about a dataset as well as the specific results in the set.

However, facets can overwhelm the user if there are too many choices. This can happen with datasets that have many different categorical attributes and associated attribute values. For instance, a geographic location attribute can have thousands or more possible values corresponding to many different cities and towns across the globe. Forcing the user to select each and every facet and/or facet value that they want included in a result set is tedious and time consuming for the user, as well as a potential source of error. Additionally, presenting all of these facets and facet values to the user may not be practical given the technical specifications of the user's computing device. For example, if the user's device has a small form factor, like a smart phone or wearable device, it may be impossible to fit all of the facets on the user's display screen and impractical to require the user to scroll through multiple pages of facets. Another technical problem is that the categorical definitions or meanings of different facets may be very for different users. In a traditional filter selection process, the results displayed would be dependent upon the user's definitions of these terms due because traditional database categorizations of these terms are inflexible. For example, the definition of the term "Fortune 500" is established at the time of system development to encompass a certain set of companies, but this term may have changed in meaning very recently, such that the predefined, static definition (i.e., the original list of companies) has become outdated.

To address these and other technical challenges, embodiments of the disclosed technologies provide a dynamic query planning system that uses a large language model to automatically select functions, such as functions for determining filters and facets, to be included in a plan for executing a search query based on the user's natural language input, without requiring the user to explicitly select those facets, filters, or other functions. For example, if the user requests "fortune 500 companies on the west coast," embodiments automatically determine the names of the fortune 500 companies located in Washington, Oregon, and California and add them as facets without requiring the user to explicitly select those company names as query terms.

Embodiments improve upon conventional information retrieval systems by, for example, removing the need for the user to make explicit facet and/or filter selections, and also by improving the system's interpretation of ambiguous words or phrases in the user's input. For instance, conventional systems receiving user input containing the phrase "fortune 500" would not recognize that phrase as referring to a group of companies and simply include the phrase in the query verbatim, such that the result set would include items that mention the phrase "fortune 500" whether or not the item actually matches a company that is in the Fortune 500.

Instead of the conventional approach, embodiments of the disclosed technologies can interpret the user's input, "fortune 500," into the specific names of companies that are in the Fortune 500 and automatically modify the query to include those company names. This enables the information retrieval system to return relevant results without requiring the user to know of the relevant facet values (e.g., all of the names of all of the companies that are in the Fortune 500) (i.e., removing the requirement that the user needs to know the definition of "Fortune 500" and which companies are currently in that list, as well as removing the requirement that the system store and maintain a static definition in a data structure), and without requiring the user to explicitly select all of those facets. This aspect can be particularly helpful for sets of facet values that can frequently change, such as rankings (e.g., top ten colleges for biochemistry, etc.). As another example, if the user selects a facet, embodiments can automatically modify the query to include not only the user-selected facet but also other unselected but related facets, which are obtained via execution of a query plan generated by a large language model. For instance, if the user inputs a request for "engineers with AI experience" and selects "ChatGPT 3.0" as a facet, embodiments can automatically expand the query to include earlier or subsequent versions of ChatGPT (e.g., ChatGPT 3.5, ChatGPT 4.0, etc.) without requiring the user to explicitly identify all of those subsequent versions.

To accomplish these and other improvements to conventional information retrieval systems, embodiments can dynamically configure a prompt to include instructions to cause one or more generative artificial intelligence models (e.g., one or more large language models) to generate and output a plan for executing a query. In accordance with the instructions set forth in the prompt, the large language model is to generate a query execution plan that includes a set of functions, where the set of functions are executable using a set of data resources to create a modified version of the initial query. Also in accordance with the instructions set forth in the prompt, the large language model is to select the set of functions in accordance with the user's explicit and/or implicit signals, e.g., the query input by the user and/or the user's history of interactions with the user interface.

A generative artificial intelligence (GAI) model or generative model uses artificial intelligence technology, e.g., neural networks, to machine-generate new digital content based on model inputs and the previously existing data with which the model has been trained. Whereas discriminative models are based on conditional probabilities P (y|x), that is, the probability of an output y given an input x (e.g., is this a photo of a dog?), generative models capture joint probabilities P (x, y), that is, the likelihood of x and y occurring together (e.g., given this photo of a dog and an unknown person, what is the likelihood that the person is the dog's owner, Sam?).

A generative language model is a particular type of GAI model that is capable of generating new text in response to model input. The model input includes a task description, also referred to as a prompt. The task description can include instructions and/or examples of digital content. A task description can be in the form of natural language text, such as a question or a statement, and can include non-text forms of content, such as digital imagery and/or digital audio.

Given a task description, a generative model can generate a set of task description-output pairs, where each pair contains a different output. In some implementations, the generative model assigns a score to each of the generated task description-output pairs. The output in a given task description-output pair contains text that is generated by the model itself rather than provided to the model as an input.

The score associated by the model with a given task description-output pair represents a probabilistic or statistical likelihood of there being a relationship between the output and the corresponding task description in the task description-output pair. The score for a given task description-output pair is dependent upon the way the generative model has been trained and the data used to perform the model training. The generative model can sort the task description-output pairs by score and output only the pair or pairs with the top scores. For example, the generative model could discard the lower-scoring pairs and only output the top-scoring pair as its final output.

A large language model (LLM) is a type of generative language model that is trained in an unsupervised way on massive amounts of unlabeled data, such as publicly available texts extracted from the Internet, using deep learning techniques. A large language model can be configured to perform one or more natural language processing (NLP) tasks, such as generating text, classifying text, answering questions in a conversational manner, and translating text from one language to another.

However, large language models have technical challenges including hallucination and latency. In artificial intelligence, a hallucination is often defined as model output, e.g., generated content, that diverges from the model input, e.g., is nonsensical, incorrect, or unrelated to the provided input. If the model input is not clearly defined or is repetitive, the risk of AI hallucination increases. Additionally, large language models consume large amounts of computing resources and as such can introduce nontrivial amounts of latency into the information retrieval pipeline. As a result of these and other concerns, it is a technical challenge to incorporate the use of LLMs and/or other GAI models into the operational flows of an information retrieval system while mitigating the risks of, e.g., AI hallucination and latency.

Another technical challenge is how to reduce the burden of user input when processing and executing queries; for example, how to reduce the need for the user to explicitly select facets. Yet another technical challenge is how to scale a GAI-based query planning system to a large number of users (e.g., hundreds of thousands to millions or more users of an Internet-based information retrieval system) without needing to increase the size of the system linearly. An additional technical challenge is how to configure a GAI-based query planning system efficiently over a variety of user devices, e.g., adapting the inputs to and outputs of the GAI-based system to different applications and/or to different form factors of user devices, e.g., different sizes of display screens, different device types, different operating systems, etc.

To address these and other technical challenges, embodiments of the disclosed technologies can dynamically constrain the output of a GAI model by providing the GAI model with instructions (e.g., statements, questions, examples, conditions, and/or constraints) that are configured based on the most recent current context. As an example, the disclosed technologies may generate a prompt that instructs the GAI model to develop a plan with a constraint that the query should not include more than a certain maximum number of facets. If, based on subsequent context data such as zero results returned or user feedback indicating that the user did not view any items in the result set, the disclosed technologies can dynamically modify the prompt to, for example, increase or decrease the maximum number of facets specified in the constraint, in accordance with the subsequent context data. As another example, embodiments can dynamically select or omit certain prompt portions (e.g., include or omit certain instructions), or dynamically change the prompt type (e.g., switch from a few-shot prompt to a zero-shot prompt or from a chain-of-thought prompt to a few-shot prompt) in response to changes in performance metrics associated with large language model, availability of data resources, and/or other context data.

Alternatively or in addition, embodiments dynamically manage communications with the one or more GAI models to address latency and/or other performance issues associated with a computing system or network. For example, the disclosed technologies may assign weights to data sources based on performance metrics associated with the data sources. Based on subsequent context data such as the user abandoning a search due to high latency, the disclosed technologies can dynamically modify the prompt to instruct the GAI model to increase or decrease the weights so that high latency data sources can be excluded from the plan and other data sources may be included in the plan, in accordance with the subsequent context data.

Further additionally and/or alternatively, embodiments can configure one or more prompts to cause a GAI model to generate a query execution plan that can be executed by, e.g., the information retrieval system, to perform query expansion on the user's input. In other words, whereas prior techniques may simply instruct a GAI model to output additional query terms based on a model input (i.e., the GAI model itself generates and outputs the additional terms), embodiments of the disclosed technologies instead prompt the GAI model to generate a query execution plan that can be executed by, e.g., the information retrieval system, to obtain additional terms that can be added to the query (i.e., the GAI model outputs a plan that can be executed by the information retrieval system to obtain the additional terms from one or more data resources).

Whereas prior techniques may utilize a GAI model (e.g., a large language model) to generate additional query terms for query enhancement, those prior techniques suffer from the problems discussed above, including AI hallucination and latency issues. For instance, using a GAI model to generate additional query terms can result in multiple calls to the GAI model just to perform query enhancement for a single query. Also, multiple calls to the GAI model, or calls without context-adjusted constraints, can cause the GAI model to output query terms that aren't relevant or helpful at all.

By contrast, the disclosed approach can reduce the number of calls to the GAI model by using the GAI model to generate a query execution plan, rather than merely using the GAI model to generate additional query terms. Of course, the query execution plan produced by the GAI model could include a function that calls a GAI model to obtain additional query terms from the GAI model, but, according to the disclosed technologies, the inclusion of such a function in the plan, or the execution of that function, can be conditioned on the availability of the GAI model and other performance metrics associated with the GAI model.

Certain aspects of the disclosed technologies are described in the context of generative artificial intelligence models that receive text input and output text. However, the disclosed technologies are not limited to generative models that receive text input and produce text output. For example, aspects of the disclosed technologies can be used to receive input and/or generate output that includes non-text forms of content, such as digital imagery, videos, multimedia, audio, hyperlinks, and/or platform-independent file formats.

Certain aspects of the disclosed technologies are described in the context of electronic dialogs conducted via a network with at least one information retrieval system, such as a message- or chat-based information retrieval system or a search service of an online system such as a social network system. However, aspects of the disclosed technologies are not limited to message- or chat-based information retrieval systems or social network services, but can be used to improve various types of applications. Any network-based application can act as an application to which the disclosed technologies can be applied. For example, news, entertainment, and e-commerce apps installed on mobile devices, enterprise systems, messaging systems, notification systems, search engines, workflow management systems, collaboration tools, and social graph-based applications can all function as applications with which the disclosed technologies can be used.

The disclosure will be understood more fully from the detailed description given below, which references the accompanying drawings. The detailed description of the drawings is for explanation and understanding, and should not be taken to limit the disclosure to the specific embodiments described.

In the drawings and the following description, references may be made to components that have the same name but different reference numbers in different figures. The use of different reference numbers in different figures indicates that the components having the same name can represent the same embodiment or different embodiments of the same component. For example, components with the same name but different reference numbers in different figures can have the same or similar functionality such that a description of one of those components with respect to one drawing can apply to other components with the same name in other drawings, in some embodiments.

Also, in the drawings and the following description, components shown and described in connection with some embodiments can be used with or incorporated into other embodiments. For example, a component illustrated in a certain drawing is not limited to use in connection with the embodiment to which the drawing pertains, but can be used with or incorporated into other embodiments, including embodiments shown in other drawings.

As used herein, dialog, chat, or conversation may refer to one or more conversational threads involving a user of a computing device and an application. For example, a dialog or conversation can have an associated user identifier, session identifier, conversation identifier, or dialog identifier, and an associated timestamp. Thread as used here may refer to one or more rounds of dialog involving the user and an application. A round of dialog as used herein may refer to a user input and an associated system-generated response, e.g., a reply to the user input that is generated at least in part via a generative artificial intelligence model. Any dialog or thread can include one or more different types of digital content, including natural language text, audio, video, digital imagery, hyperlinks, and/or multimodal content such as web pages.

FIG. 1A is a flow diagram of an example method for dynamic query planning using components of a dynamic query planning system in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of dynamic query planning system 110, including, in some embodiments, components or flows shown in FIG. 1A that may not be specifically shown in other figures and/or including, in some embodiments, components or flows shown in other figures that may not be specifically shown in FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 1A, an example computing system 100 is shown, which includes an example dynamic query planning system 110. In the example of FIG. 1A, the components of the dynamic query planning system 110 are implemented using an application server or server cluster, which can include a secure environment (e.g., secure enclave, encryption system, etc.) for the processing of data. In other implementations, one or more components of the dynamic query planning system 110 are implemented on a client device, such as a user system 610, described herein with reference to FIG. 6, running an application 102. For example, some or all of dynamic query planning system 110 is implemented directly on the user's client device in some implementations, thereby avoiding the need to communicate with servers over a network such as the Internet. In some implementations, the dynamic query planning system 110 is in bidirectional communication with one or more applications 102 via a computer network. The one or more applications 102 include front end user interface functionality that, in some embodiments, is considered part of or is in communication with dynamic query planning system 110.

In the embodiment of FIG. 1A, the dynamic query planning system 110 includes an input classification prompt generator 112, a plan generation prompt generator 120, and an executor 126. A large language model 116 can be part of the dynamic query planning system 110 or a separate component. For example, the large language model 116 can be hosted by an AI model service, such as AI model service 690 described herein with reference to FIG. 6. Data resources 134 can be part of the dynamic query planning system 110 or separate components. For example, data resources 134 can be part of data resources 650 described herein with reference to FIG. 6.

Prompt as used herein may refer to one or more instructions that are readable by a GAI model, such as large language model 116, along with the input to which the GAI model is to apply the instructions, and a set of parameter values that constrain the operations of the GAI model during the processing of the prompt and generating and outputting a response to the prompt. The input can include user input and/or context data. The input can be specified explicitly in the prompt or as a reference that is processed at execution time. The instructions can include one or more statements, questions, conditions, constraints, or examples. The examples can include examples of the types of output to be produced by the GAI model and/or examples of the types of processing steps the large language model is to perform in order to generate output. The parameter values contained in the prompt can be specified by the GAI model and may be adjustable in accordance with the requirements of a particular design or implementation. Examples of parameter values include the maximum length or size of the prompt and the temperature, or degree to which the model produces deterministic output versus random output. The way in which the elements of the prompt are organized and the phrasing used to articulate the prompt elements can significantly affect the output produced by the GAI model in response to the prompt. For example, a small change in the prompt content or structure can cause the GAI model to generate a very different output.

The input classification prompt generator 112 configures an input classification prompt for input to large language model 116. The input classification prompt includes one or more instructions that can be input to the large language model 116, such that when the large language model 116 reads and processes the instructions, the large language model 116 translates the user input (e.g., first query 106 received via user interface mechanism 104 of application 102) and/or associated context data (e.g., context data 108) into a corresponding intent and outputs the intent. Intent as used herein may refer to a structured representation of a user input such as the first query 106. An example of a structured representation of a user input includes a canonical representation of an action (e.g., job_search, people_search), and at least one attribute value associated with the action (e.g., search criteria). For instance, if the user input is "find backfill for Amelia," a corresponding intent that could be output by the large language model 116 in response to the input classification prompt provided by the input classification prompt generator 112 is people_search (Amelia).

Examples of context data 108 include data logged during the user's use of a particular application 102, such as data input, output, or interacted with, the timestamp at the user's login in to the application, and actions taken by the user during the login session, including implicit and/or explicit user interactions with the application's user interface elements. Alternatively or in addition, context data may refer to historical data logged during the user's prior uses of the application and/or aggregate data that represents usage statistics across a group or population of users of the application 102. For example, context data 108 can include implicit signals such as a count of the number of times suggestions or insights have been presented to the user, the number of times users acted upon suggestions or insights provided by the system, the latency in the user's response to a suggestion or insight. As another example, context data 108 can include explicit signals such as explicit social reactions (e.g., thumbs-up, thumbs-down, comments, shares, follows) and/or other explicit or implicit feedback signals. Context data 108 can be included in the input classification prompt 114 as an input along with an instruction to cause the large language model 116 to determine the input classification 118 based on the context data 108.

In some implementations, the input classification prompt generator 112 configures the input classification prompt as a zero-shot prompt. As used herein, zero-shot prompt may refer to a type of large language model prompt that does not include any examples, e.g., the prompt only includes an input and a task description that does not include any examples to guide the large language model as to how to perform the task. An example of a zero-shot input classification prompt that can be generated by the input classification prompt generator 112 is "classify the user input [input1] into job_search, people_search, or company_search," where [input1] is a placeholder for the user input and/or associated context data and job_search, people_search, and company_search are the possible intents into which the large language model may classify input1.

In some implementations, the input classification prompt generator 112 configures the input classification prompt as a few-shot prompt that includes examples of input classifications along with an instruction to cause the large language model to follow the examples when processing a new input. An example of a few-shot prompt that can be generated by the input classification prompt generator 112 is "'software engineering'→job_search; 'fill'→job_candidate_search; what is the intent of [input1]?" where input1 includes the user input (e.g., first query 106) and/or context data 108.

While not specifically shown in the drawings, in some implementations, the input classification prompt generator 112 does not use the large language model 116 to perform input classification. For example, input classification prompt generator 112 could be configured to formulate a feature set for input to a classical machine learning model (e.g., a binary classifier) or to apply a set of heuristics to the user input (e.g., first query 106) and associated context data, instead of formulating the LLM prompt. For instance, depending upon performance metrics associated with the large language model 116, the input classification prompt generator 112 could use one of these and/or other alternative techniques, instead of the large language model 116, for translating the user input (e.g., first query 106) into an intent.

In the example of FIG. 1A, the input classification prompt generator 112 outputs an input classification prompt 114 for input to the large language model 116. An example method that may be performed by the input classification prompt generator 112 is shown in more detail in FIG. 2, described below. In response to and based on the input classification prompt 114, the large language model 116 reads and processes the input classification prompt 114, translates the user input (e.g., first query 106) into an intent, and outputs the intent as input classification 118.

The plan generation prompt generator 120 configures a plan generation prompt 122 based on the input classification 118 produced by the large language model 116. The plan generation prompt 122 is designed to cause the large language model 116 to generate and output a query execution plan. A query execution plan includes a set of functions which can be executed by executor 126 to create a modified version of the user input (e.g., a modified version of first query 106). For example, a query execution plan can include a set of functions that retrieve data from multiple different data resources 134 and incorporate at least some of that retrieved data into the modified version of the user input. Examples of functions that can be included in the set of functions selected by the large language model 116 to be included in the plan 124, based on the plan generation prompt 122, include a function to retrieve entity data related to the first query 106 using a taxonomy (e.g., retrieve facet values), to retrieve entity data related to the first query 106 using an entity graph (e.g., to retrieve facet values, facets, or filters), to execute a client application command related to the first query 106, to execute a server command related to the first query 106, to cause a generative model to generate and output content related to the first query 106, or to cause a generative model to generate and output at least one embedding related to the first query 106.

In some implementations, the plan generation prompt generator 120 configures the plan generation prompt 122 as a few-shot prompt. A few-shot prompt as used herein may refer to a type of large language model prompt that includes an input and an instruction, where the instruction includes one or more examples, e.g., demonstrations of the type of output the large language model is to produce based on the input. For instance, the few-shot prompt could include one or more examples of query execution plans that have been generated based on other inputs and an instruction to generate a query execution plan based on the current user input and the one or more examples.

In some implementations, the plan generation prompt generator 120 configures the plan generation prompt 122 as a chain-of-thought prompt. A chain-of-thought prompt as used herein may refer to a type of large language model prompt that includes an input and an example of the types of steps the large language model is to perform; for example, intermediate steps or reasoning. For example, the chain-of-thought prompt could include examples that illustrate to the large language model examples of how to select functions or logical groupings of functions to be included in the query execution plan.

In some implementations, the plan generation prompt generator 120 configures the plan generation prompt 122 as multi-step prompt, for example using prompt chaining. Prompt chaining as used herein may refer to a series of prompts or a prompt that includes an ordered set of sub-prompts, where each prompt or sub-prompt is to cause the large language model to perform a smaller or discrete step of the overall process of generating a query execution plan.

In some implementations, the plan generation prompt generator 120 configures the plan generation prompt 122 as a zero-shot prompt. For example, if the input classification 118 indicates that only a single function needs to be performed to resolve the intent or the intent maps to a predetermined plan that does not need to be modified or configured, then a zero-shot prompt may be used.

In the example of FIG. 1A, the plan generation prompt generator 120 outputs the plan generation prompt 122 for input to the large language model 116. An example method that may be performed by the plan generation prompt generator 120 is shown in more detail in FIG. 3, described below. In response to and based on the plan generation prompt 122, the large language model 116 reads and processes the plan generation prompt 122, selects a set of functions, and generates and outputs the query execution plan 124, which includes the selected set of functions. An example method that may be performed by the large language model 116 in processing the plan generation prompt 122 is shown in more detail in FIG. 4, described below.

In some instances or iterations, the plan generation prompt generator 120 is not used (e.g., skipped) and the large language model 116 is not used to generate a query execution plan. For example, in instances or iterations in which the input classification (e.g., intent) 118 is unambiguous and/or does not require execution of more than one function for resolution, the executor 126 can formulate the modified version of the user input directly based on the input classification 118 without needing to execute a plan.

The executor 126 executes the plan 124 to translate the user input (e.g., first query 106) to a modified version of the user input (e.g., a modified version of first query 106). For example, the executor 126 executes a set of functions contained in the plan 124 according to an order of execution specified in the plan 124 to obtain at least one second query term 128 from one or more data resources 134, formulates a second query 130 based on or including the at least one second query term 128, executes the second query 130 using one or more of the data resources 134 to obtain query results 132, formulates a response and/or commands 150 based on the query results 132, and provides the response and/or commands 150 to the application 102. For example, the executor 126 executes the plan to query one or more of the data resources 134 to obtain facet values and includes those facet values in the second query 130. The executor 126 then executes the second query 130, which is a modified version of the first query 106 (e.g., an expanded version of the first query 106 that includes the facet values retrieved from the one or more data resources 134), to obtain the query results 132 and formulate the response and/or commands 150.

A benefit of executing the plan is that if the system were to only process the initial query without creating and executing the plan as described herein, the system would not return all of the relevant results, e.g., those candidates that are responsive to the search for backfill for Amelia. The lack of relevant results causes additional search query iterations between the user and the system, or potentially causes the user to completely abandon the search without obtaining the desired information. Thus, the modification of the query using the plan generation and execution approach described improves the relevance and completeness of the information retrieved and provided in the result set, e.g., the list of candidates who would be best suited to backfill Amelia's positions, and also improves the efficiency and reliability of the search system.

Examples of responses that can be formulated by executor 126 as a result of executing the plan 124 include job search results related to the first query 106, job candidate search result related to the first query 106, entity profile pages related to the first query, blog pages related to the first query 106, learning content items related to the first query 106, and/or recommendations to improve the first query 106. Examples of commands that can be formulated by executor 126 as a result of executing the plan 124 include at least one command to modify a component of the user interface of application 102 as a result of execution of the plan 124, to navigate to a content item or component via the user interface of application 102 as a result of execution of the plan 124, to populate a component of the user interface of application 102 with information obtained as a result of execution of the plan 124, to store information created at the user interface of application 102 as a result of execution of the plan 124, to send an electronic communication to at least one second user of the application 102 identified as a result of execution of the plan 124, and/or to schedule an action to be performed by the application 102 as a result of execution of the plan 124.

The data resources 134 include, for example, entity profile data 136 (e.g., user profiles data, company profiles, job postings, etc.), activity data 138 (e.g., historical interaction data such as search histories, chat histories, and/or interaction histories associated with the user's use of application 102), electronic documents 140, including documents and other content items that are accessible via Internet search engines, such as web pages and multimedia content, taxonomies, data stores, services, or artificial intelligence models 142, entity graphs and knowledge graphs 144, applications 146, such as other vertical applications and/or external applications which may be in communication with application 102, and metrics 148, such as performance metrics associated with the large language model 116 or any of the data resources 134. Entity profile data 136 includes, for example, current and/or historical attribute data associated with the user (e.g., user preferences and/or biographical data such as skills, work experiences, and education history) or another entity associated with the user (such as a company or a computing resource), which may be logged by event logging service 670 and/or stored in entity data store 662, described below with reference to FIG. 6. Activity data 138 includes, for example, current and/or historical user interaction data logged by event logging service 670 and/or stored in activity data store 664, described below with reference to FIG. 6. Entity graphs and knowledge graphs 144 include, for example, current and/or historical data that describe various relationships between or among different entities in a social graph. For example, entity graphs and knowledge graphs 144 can include one or more portions of entity graph 632 and/or knowledge graph 634, described below with reference to FIG. 6.

Large language model 116 includes one or more neural network-based machine learning models. In some implementations, large language model 116 is constructed using a neural network-based deep learning model architecture. In some implementations, the neural network-based architecture includes one or more input layers that receive model inputs, generate one or more embeddings based on the model inputs, and pass the one or more embeddings to one or more other layers of the neural network. In other implementations, the one or more embeddings are generated based on the model input by a pre-processor, the embeddings are input to the neural network model, and the neural network model generates output based on the embeddings.

In some implementations, the neural network-based machine learning model architecture includes one or more self-attention layers that allow the model to assign different weights to portions of the model input. Alternatively or in addition, the neural network architecture includes feed-forward layers and residual connections that allow the model to machine-learn complex data patterns including relationships between different portions of the model input in multiple different contexts. In some implementations, the neural network-based machine learning model architecture is constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation of the dynamic query planning system 110.

In some examples, the neural network-based machine learning model architecture includes or is based on one or more generative transformer models, one or more generative pre-trained transformer (GPT) models, one or more bidirectional encoder representations from transformers (BERT) models, one or more large language models (LLMs), one or more XLNet models, and/or one or more other natural language processing (NL) models. In some examples, the neural network-based machine learning model architecture includes or is based on one or more predictive text neural models that can receive text input and generate one or more outputs based on processing the text with one or more neural network models. Examples of predictive neural models include, but are not limited to, Generative Pre-Trained Transformers (GPT), BERT, and/or Recurrent Neural Networks (RNNs). In some examples, one or more types of neural network-based machine learning model architectures include or are based on one or more multimodal neural networks capable of outputting different modalities (e.g., text, image, sound, etc.) separately and/or in combination based on textual input. Accordingly, in some examples, a multimodal neural network implemented in the dynamic query planning system is capable of outputting digital content that includes a combination of two or more of text, images, video or audio.

In some implementations, large language model 116 is trained on a large dataset of digital content such as natural language text, images, videos, audio files, or multi-modal data sets. For example, training samples of digital content such as natural language text extracted from publicly available data sources are used to train one or more generative models used by the dynamic query planning system. The size and composition of the datasets used to train one or more models used by the dynamic query planning system can vary according to the requirements of a particular design or implementation of the dynamic query planning system. In some implementations, one or more of the datasets used to train one or more models used by the dynamic query planning system includes hundreds of thousands to millions or more different training samples.

In some embodiments, one or more models used by the dynamic query planning system include multiple generative models trained on differently sized datasets. For example, a dynamic query planning system can include a comprehensive but low capacity generative model that is trained on a large data set, and the same generative model also can include a less comprehensive but high capacity model that is trained on a smaller data set, where the high capacity model is used to generate outputs based on examples obtained from the low capacity model. In some implementations, reinforcement learning is used to further improve the output of one or more models used by the dynamic query planning system. In reinforcement learning, ground-truth examples of desired model output are paired with respective inputs, and these input-example output pairs are used to train or fine tune one or more models.

In an illustrative example of an operation of the dynamic query planning system 110, a user interacting with application 102 inputs a first query 106 of "find backfill for Amelia" into a chat-style input box 104. The dynamic query planning system 110 receives the first query 106 and associated context data 108 (e.g., the name, type, or identifier of the application 102). The input classification prompt generator 112 generates and outputs an input classification prompt 114 that instructs the large language model 116 to classify the first query 106 based on the text of the query and the application identifier. The large language model 116 outputs an input classification 118 of Candidate_Search (Amelia), indicating that the large language model 116 has translated "find backfill" as an intent to search for job candidates.

The plan generation prompt generator 120 configures a prompt that instructs the large language model 116 to create a plan to find job candidates similar to Amelia. The specific context of looking for job candidates can be determined based on the application identifier, which may indicate that the application 102 is an application that allows users to search for job candidates. The large language model 116 outputs a plan 124 that includes a set of functions arranged in an order of execution, as needed, such that the output of one function can be used as an input to another function if needed. For example, to resolve the intent of Candidate_Search (Amelia), the executor 126 executes a set of functions to determine the user identifier associated with Amelia, obtain Amelia's profile page, extract relevant information such as job title and skills from Amelia's profile page, generate a job description based on one or more of the extracted skills (possibly using the large language model 116 to generate the job description text based on the information extracted from Amelia's profile page), and then search for job candidates that match Amelia's job title, skills, and/or the generated job description.

In generating the final candidate search query (e.g., second query 130), the original input is modified to include one or more second query terms 128, e.g., facets such as particular skills and/or filters such as particular job titles and/or particular search criteria such as a job description. In doing so, the executor 126 may obtain the additional facets, filters, and/or search criteria from one or more of the data resources 134. For example, executor 126 may query the entity graph and knowledge graph 144 or data stores or taxonomies 142 to obtain related skills.

Based on the results of executing the second query 130 against, e.g., a database of job candidates, the query results 132 are obtained and used to formulate the response and/or commands 150. For example, the response and/or commands 150 includes a listing of relevant job candidates 152 that has been generated based on the execution of the second query 130 and an insight or recommendation 154 that has been subsequently generated based on the user's interactions with the listing 152. For example, subsequent context data 108 including interaction data logged in response to the presentation of the search results 152 is used to generate the insight or recommendation 154.

The examples shown in FIG. 1A and the accompanying description, above are provided for illustration purposes. This disclosure is not limited to the described examples. Additional or alternative details and implementations are described herein.

Figure 1B:
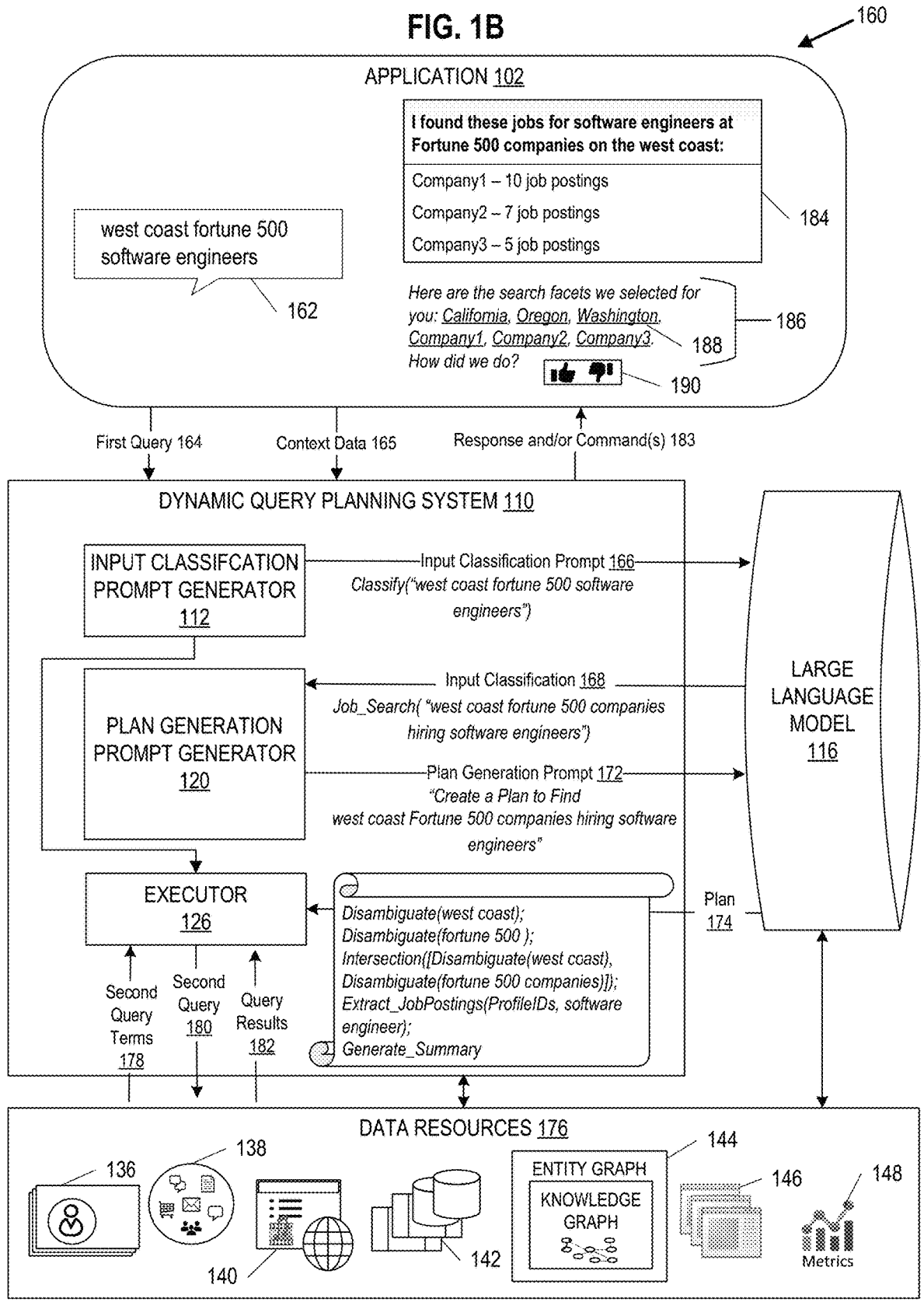
FIG. 1B is a flow diagram of an example method for dynamic query planning using components of a dynamic query planning system in accordance with some embodiments of the present disclosure.

FIG. 1B is a flow diagram of an example method for dynamic query planning using components of a dynamic query planning system in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of dynamic query planning system 110, including, in some embodiments, components or flows shown in FIG. 1B that may not be specifically shown in other figures and/or including, in some embodiments, components or flows shown in other figures that may not be specifically shown in FIG. 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 1B, an example computing system 160 is similar or identical to the computing system 100, except that FIG. 1B illustrates the dynamic nature of the dynamic query planning system 110 in terms of how the dynamic query planning system 110 automatically generates different prompts and different corresponding query execution plans using, potentially, different data resources, in response to different combinations of user input and/or context data.

In the illustrative example of FIG. 1B, a user interacting with application 102 inputs a first query 164 of "west coast fortune 500 software engineers" into a chat-style input box 162. The dynamic query planning system 110 receives the first query 164 and associated context data 165 (e.g., the name, type, or identifier of the application 102 and/or interaction history data such as a previous search query). The input classification prompt generator 112 generates and outputs an input classification prompt 166 that instructs the large language model 116 to classify the first query 164 based on the text of the query and the associated context data 165, such as the application identifier. The large language model 116 outputs an input classification 168 of Job_Search ("west coast fortune 500 software engineers"), indicating that the large language model 116 has translated "west coast fortune 500 software engineers" into an intent to search for jobs for software engineers, where the jobs have been posted by west coast fortune 500 companies. For example, if the application identifier indicates that the user has navigated to the job search application, this information can be used as an input that is provided to the large language model 116 as part of the input classification prompt 166.

The plan generation prompt generator 120 configures a plan generation prompt 172 that instructs the large language model 116 to create a plan to find west coast Fortune 500 companies that are hiring software engineers. The large language model 116 outputs a plan 174 that includes a set of functions arranged in an order of execution, as needed, such that the output of one function can be used as an input to another function if needed. For example, to resolve the intent of Job_Search ("west coast fortune 500 software engineers"), the executor 126 executes a set of functions to disambiguate "west coast," disambiguate "fortune 500," find the intersection of the set of west coast companies and Fortune 500 companies, query a jobs database for job postings for software engineers at the west coast Fortune 500 companies, and generate a summary of the search results (possibly using the large language model 116 to summarize, for the user, the search results or individual job postings).

In generating the final job search query (e.g., second query 180), the original user input is modified to include one or more second query terms 178, e.g., facets such as particular skills associated with software engineering and/or filters such as particular company names. In doing so, the executor 126 may obtain the additional facets, filters, and/or search criteria from one or more of the data resources 176. For example, executor 126 may query an external data source 142, such as Internet web pages, to obtain a list of Fortune 500 companies, and/or search a knowledge graph 144 to determine which of those Fortune 500 companies are located on the west coast. The data resources 176 used by executor 126 to execute the plan 174 can be selected and included in the plan 174 by the large language model 116 based on the input classification 168 and/or other factors, such as performance metrics or availability of the data resources. The data resources 176 used to process and execute the first query 164 can be different from the data resources 134 used to process and execute the first query 106 of the example of FIG. 1A.

Based on the results of executing the second query 180 against, e.g., a database of job postings, the query results 182 are obtained and used to formulate the response and/or commands 183. For example, the response and/or commands 183 includes a listing of relevant job postings 184 that has been generated based on the execution of the second query 180 and an explanation 186 of how the dynamic query planning system 110 formulated the second query 180.

For example, the list of job postings 184 includes a restatement of the user's original input (e.g., first query 164), and presents the list of facets 188 that were automatically selected by the executor 126, for review and verification by the user. If the restatement and/or facet selections are incorrect, the user can click on the thumbs-down feedback mechanism 190 to register the feedback with the dynamic query planning system 110 (which can be added to the context data 165 for subsequent query iterations) and proceed to modify the query by unselecting facets that were automatically selected by the dynamic query planning system 110 and/or selecting other facets that were not automatically selected by the dynamic query system. In other words, the user does not have to review or scroll through the search results in order to figure out whether the dynamic query planning system 110 correctly interpreted their input. If the dynamic query planning system 110 correctly interpreted the user's input, the user can click on the thumbs-up feedback mechanism 190 to provide the feedback to the query planning system 110 for inclusion in the context data 165 for subsequent query iterations, and/or review the list of search results. The list of search results 184 has been curated and summarized by the executor 126 executing the query execution plan 174 provided by the large language model 116. For example, the job postings are grouped by facet value (e.g., company name) and a count of the number of job postings associated with each facet value is provided.

The examples shown in FIG. 1B and the accompanying description, above are provided for illustration purposes. This disclosure is not limited to the described examples. Additional or alternative details and implementations are described herein.

Figure 2:
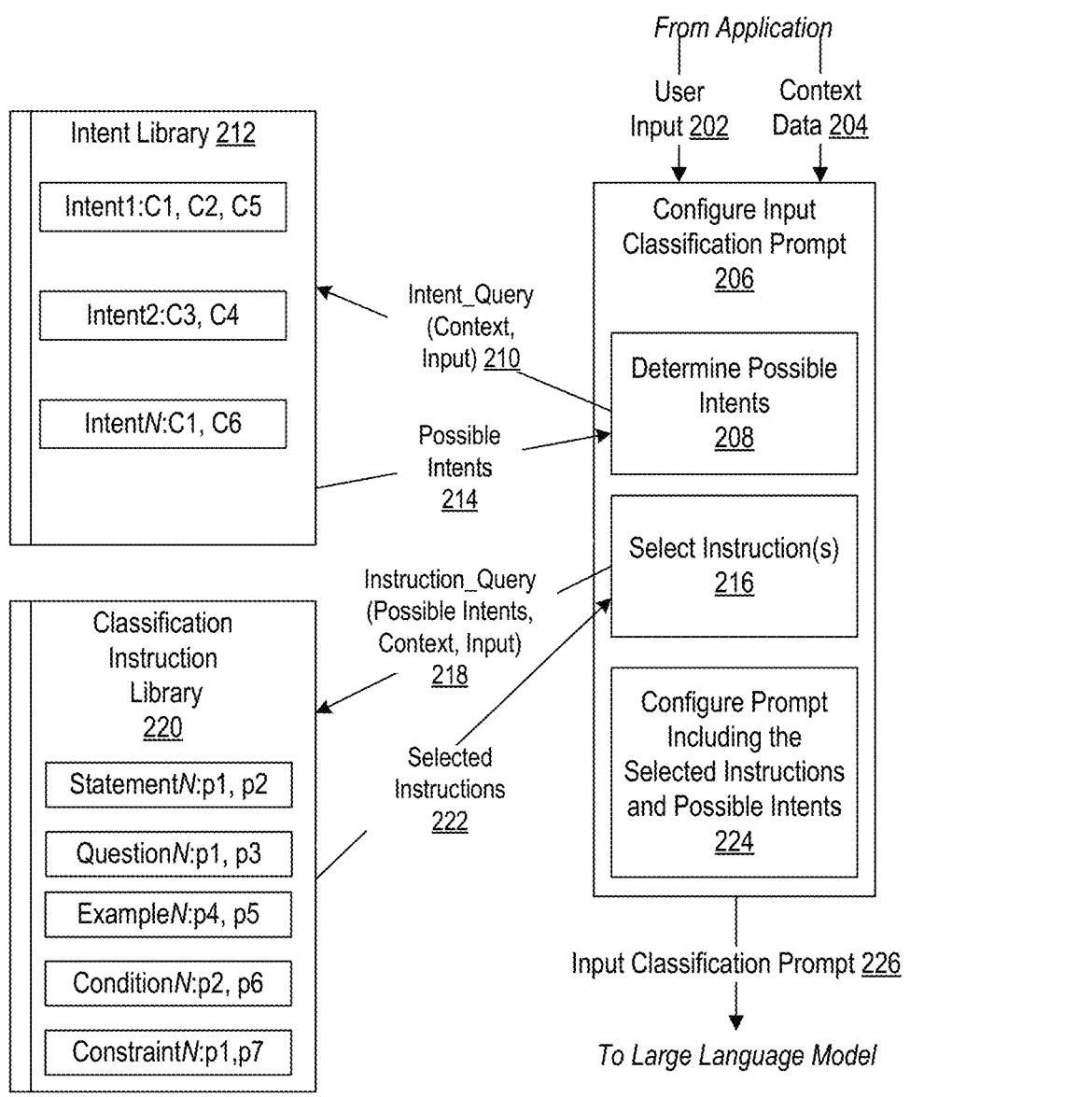
FIG. 2 is a flow diagram of an example method for configuring an input classification prompt using components of a dynamic query planning system in accordance with some embodiments of the present disclosure.

FIG. 2 is a flow diagram of an example method for configuring an input classification prompt using components of a dynamic query planning system in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of dynamic query planning system 110, including, in some embodiments, components or flows shown in FIG. 2 that may not be specifically shown in other figures and/or including, in some embodiments, components or flows shown in other figures that may not be specifically shown in FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 2, an embodiment of intent classification prompt generator 112 is shown as intent classification prompt generator 200. Intent classification prompt generator 200 includes a configure input classification prompt component 206, an intent library 212, and a classification instruction library 220. Configure input classification prompt component 206 includes a determine possible intents executable component 208, a select instruction(s) executable component 216, and a configure prompt including the instructions and possible intents executable component 224. The intent library 212 and the classification instruction library 220 are included in data resources 650, or are part of AI model service 690, or are stored in one or more data stores of data storage system 660, described herein with reference to FIG. 6.

Intent library 212 stores N templatized intents, and associated metadata, such as contexts with which each intent is associated. As used herein, N may represent a positive integer whose value is determined based on the requirements or design of a particular implementation, and the value of N can be different in different instances. For instance, the total number of N intents can be different than a total number of N contexts or instructions. Intent library 212 can include an index that maps intents with associated contexts. In the example of FIG. 2, context examples can be denoted as C1, C2 . . . . CN. For instance, both Intent1 and IntentN map to the context C1, and each of the intents Intent1, Intent2, IntentN maps to more than one context, although this need not be the case.

Classification instruction library 220 stores N templatized large language model instructions, which can be used as building blocks or components of an input classification prompt configured for input to large language model 116. For instance, the instructions contained in classification instruction library 220 pertain to the large language model task of input classification. Instruction as used herein includes various possible types of instructions or portions of instructions, such as statements, questions, examples, conditions, and constraints, which can be used to formulate a large language model prompt for input classification. Instruction can also refer to a set or logical grouping of instructions, such as a series of statements or a combination of statements and examples or a combination of conditions and examples. In the example of FIG. 2, instruction examples can be denoted instructionN:pN where instruction represents the particular instruction and its associated metadata (e.g., instruction type, such as statement, question, example, condition, or constraint), and each p represents a parameter or argument that the instruction uses as input or to which the instruction can be applied. For instance, each of StatementN, QuestionN, and ConstraintN use the parameter p1, and each of the instructions includes more than one parameter, although this need not be the case.

In operation, configure input classification prompt component 206 receives user input 202 and context data 204 from an application or client device (e.g., application 102). Determine possible intents component 208 formulates an intent query 210 including the user input 202 and context data 204 as parameters. The intent query 210 is executed against the intent library 212. Based on the intent query 210, a set of one or more possible intents 214 that match the intent query 210 are returned to the determine possible intents component 208. The possible intents 208 are a subset of the templatized intents that are selected from the intent library 212 as relevant to the user input 202 and context data 204 based on the intent query 210. The possible intents 208 are included in the input classification prompt 226 so that when the large language model 116 reads and processes the input classification prompt 226, the processing performed by the large language model 116 is constrained to the possible intents 208 that are relevant for the user input 202 and the context data 204. For instance, when the large language model processes the input classification prompt 226, the large language model 116 does not have to select an intent from the entire intent library 212 but only from the relevant subset of possible intents 214.

Select instructions component 216 formulates an instruction query 218 including the user input 202, context data 204, and possible intents 214 as parameters. The instruction query 218 is executed against the classification instruction library 220. Based on the instruction query 218, a set of one or more selected instructions that match the instruction query are returned to the select instructions component 216. The selected instructions 222 are a subset of the templatized instructions that are selected from the classification instruction library 220 as relevant to the user input 202, context data 204, and possible intents 214 based on the instruction query 218. The selected instructions 222 are included in the input classification prompt 226 so that when the large language model 116 reads and processes the input classification prompt 226, the processing performed by the large language model 116 is constrained to the selected instructions 222 that are relevant for the user input 202, context data 204, and possible intents 214. For instance, when the large language model processes the input classification prompt 226, the large language model 116 only processes the selected instructions 222, e.g., only those instructions that are applicable to the possible intents 214.

The configure prompt including the selected instructions and possible intents 224 includes the possible intents 214 and the selected instructions 222 in the input classification prompt 226. The configure input classification prompt 206 outputs the input classification prompt 228 to the large language model 116.

The examples shown in FIG. 2 and the accompanying description, above are provided for illustration purposes. This disclosure is not limited to the described examples. Additional or alternative details and implementations are described herein.

Figure 3:
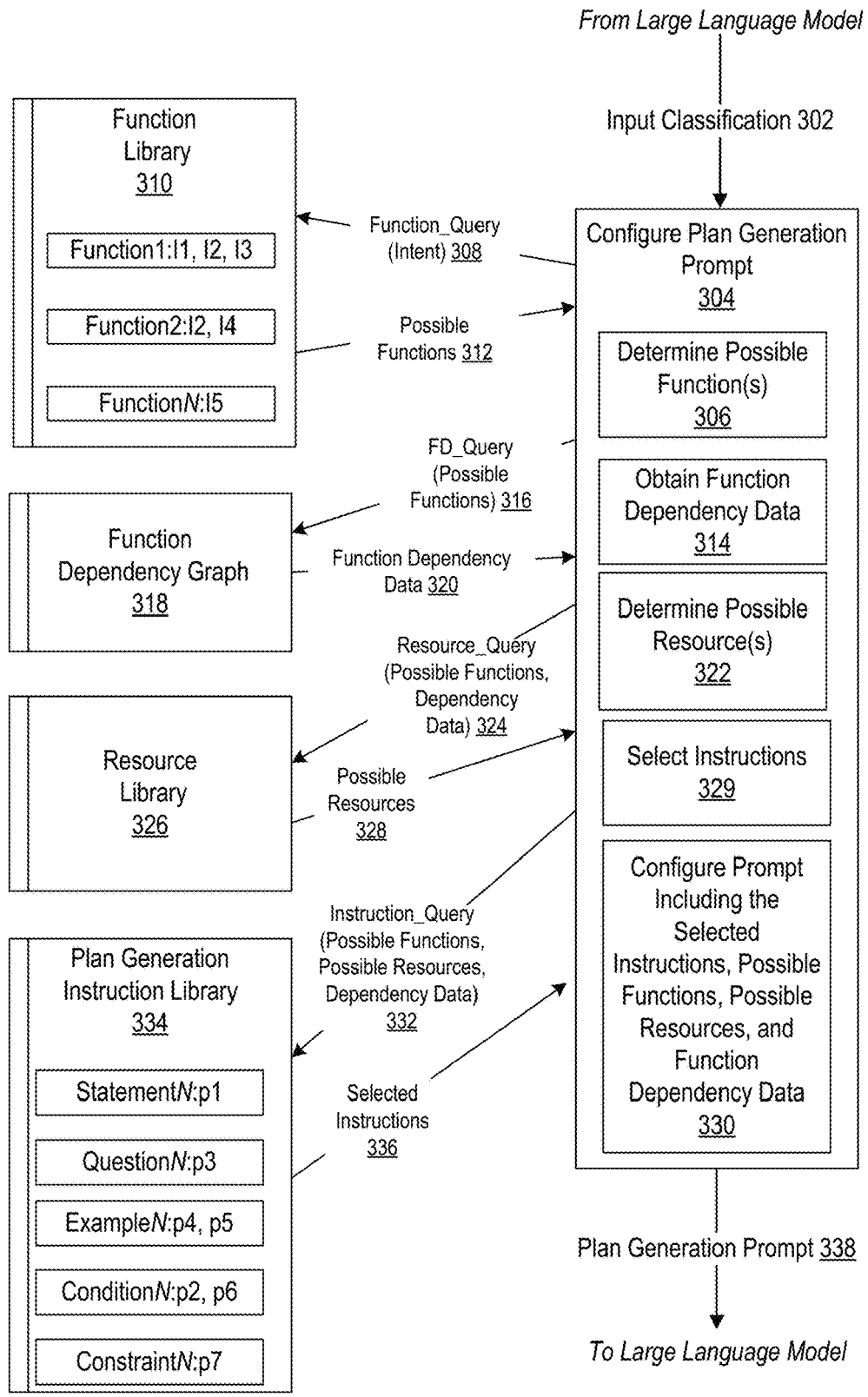
FIG. 3 is a flow diagram of an example method for configuring a plan generation prompt using components of a dynamic query planning system in accordance with some embodiments of the present disclosure.

FIG. 3 is a flow diagram of an example method for configuring a plan generation prompt using components of a dynamic query planning system in accordance with some embodiments of the present disclosure.

In FIG. 3, an embodiment of plan generation prompt generator 120 is shown as plan generation prompt generator 300. Plan generation prompt generator 300 includes a configure plan generation prompt component 304, a function library 310, a function dependency graph 318, a resource library 326, and a plan generation instruction library 334. Configure plan generation prompt component 304 includes a determine possible functions executable component 306, an obtain function dependency data component 314, a determine possible resources component 322, and a configure prompt including the instructions, possible functions, possible resources, and function dependency data executable component 330.

Figure 6:
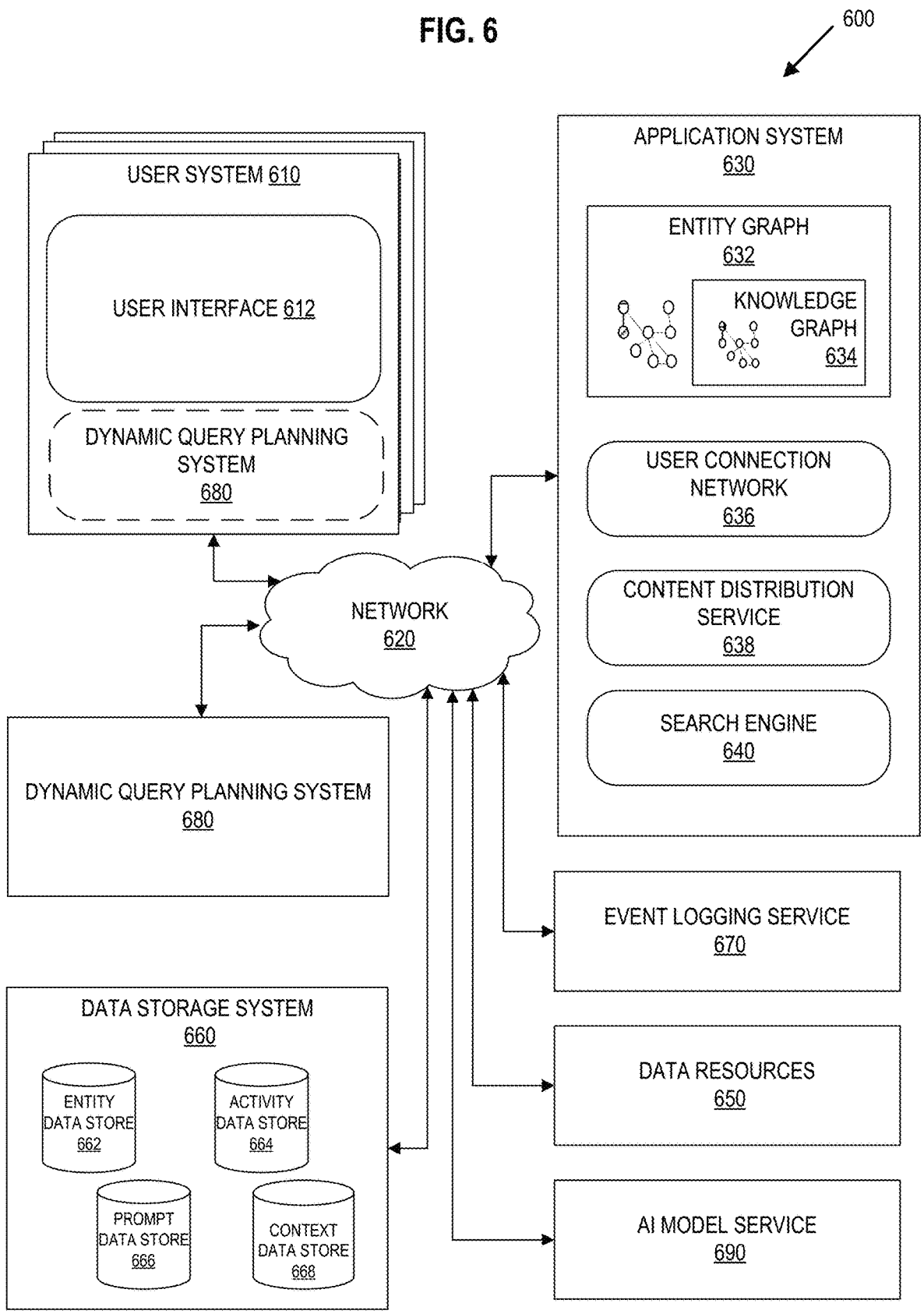
FIG. 6 is a block diagram of a computing system that includes a dynamic query planning system in accordance with some embodiments of the present disclosure.

The function library 310, function dependency graph 318, resource library 326, and plan generation instruction library 334 are included in data resources 650, or are part of AI model service 690, or are stored in one or more data stores of data storage system 660, described herein with reference to FIG. 6.

Function library 310 stores N templatized functions, and associated metadata, such as intents with which each function is associated. Function library 310 can include an index that maps functions with associated intents. In the example of FIG. 3, intent examples can be denoted as I1, I2 .... CN. For instance, both Function1 and Function2 map to the intent I2 and map to more than one intent, while FunctionN maps to only one intent, although this need not be the case.

Function dependency graph 318 stores information about dependencies between or among functions of the function library 310. For example, function dependency graph 318 is implemented as a portion of entity graph and knowledge graph 144 such that nodes in the graph represent functions and links or edges between the nodes represent dependencies. An example of a function dependency is a relationship between the input of one function and the output of another function; for instance, an input to one function can be or include the output of a different function.

Resource library 326 stores metadata and/or performance data about various data resources, e.g., data resources 134, data resources 176, or data resources 650. For example, resource library 326 stores metadata about the kinds of facets or filters that are stored in each data resource 176, the keys that are used to access the data in the data resource, or the applicable format of an API call to obtain data from the data resource. Resource library 326 can include an index that maps data resources with associated functions.

Plan generation instruction library 334 stores N templatized large language model instructions, which can be used as building blocks or components of a plan generation prompt configured for input to large language model 116. For instance, the instructions contained in plan generation instruction library 334 pertain to the large language model task of generating a query execution plan. In the example of FIG. 3, instruction examples can be denoted instructionN: pN where instruction represents the particular instruction and its associated metadata (e.g., instruction type, such as statement, question, example, condition, or constraint), and each p represents a parameter or argument that the instruction uses as input or to which the instruction can be applied. For instance, each of StatementN, QuestionN, ExampleN, ConditionN, and ConstraintN use different parameters, and some of the instructions includes more than one parameter while other instructions only include one parameter, although this need not be the case.

In operation, configure plan generation prompt component 304 receives input classification 302 from the large language model 116. The input classification 302 includes, for example, an intent determined and output by the large language model 116 in response to an input classification prompt 226. Determine possible functions component 306 formulates a function query 308 including the input classification 302 (e.g., intent) as a parameter. The function query 308 is executed against the function library 310. Based on the function query 308, a set of one or more possible functions 312 that match the function query 308 are returned to the determine possible functions component 306. The possible functions 312 are a subset of the templatized functions, which are selected from the function library 310 as relevant to the input classification 302 based on the function query 308. The possible functions 312 are included in the plan generation prompt 338 so that when the large language model 116 reads and processes the plan generation prompt 338, the processing performed by the large language model 116 is constrained to the possible functions 306 that are relevant for the input classification 302. For instance, when the large language model processes the plan generation prompt 336, the large language model 116 does not have to select functions from the entire function library 310 but only from the relevant subset of possible functions 306.

Obtain function dependency data component 314 formulates a function dependency query 316 including the possible functions 312 as parameters. The function dependency query 316 is executed against the function dependency graph 318. Based on the function dependency query 316, function dependency data 320 that matches the function dependency query 316 are returned to the obtain function dependency data component 314. The function dependency data 320 are a subgraph of the function dependency graph 318 that are selected from the function dependency graph 318 as relevant to the possible functions 312 based on the function dependency query 316. The function dependency data 320 is included in the plan generation prompt 338 so that when the large language model 116 reads and processes the plan generation prompt 338, the processing performed by the large language model 116 is constrained to the function dependency data 320 that are relevant for the possible functions 312. For instance, when the large language model processes the plan generation prompt 338, the large language model 116 only processes the function dependency data 320, e.g., only those function dependencies that are applicable to the possible functions 312, instead of the entire function dependency graph 318.

Determine possible resources component 322 formulates a resource query 324 including the possible functions 312 and function dependency data 320 as parameters. The resource query 324 is executed against the resource library 326. Based on the resource query 324, possible resources 328 that match the resource query 324 are returned to the determine possible resources component 322. The possible resources 328 are a subset of the data resources contained in the resource library 326, which are selected from resource library 326 as relevant to the possible functions 312 based on the resource query 324 and available in accordance with availability and/or performance metrics contained in the resource query 324. The possible resources 328 are included in the plan generation prompt 338 so that when the large language model 116 reads and processes the plan generation prompt 338, the processing performed by the large language model 116 is constrained to the possible resources 328 that are relevant for the possible functions 312 and function dependency data 320, and which are available in accordance with any applicable performance criteria. For instance, when the large language model processes the plan generation prompt 338, the large language model 116 only reads data pertaining to the possible resources, e.g., only those data resources that are applicable to the possible functions 312, instead of the entire resource library 326.

Select instructions component 329 formulates an instruction query 332 including the possible functions 312, possible resources 328, and function dependency data 320 as parameters. The instruction query 332 is executed against the plan generation instruction library 334. Based on the instruction query 332, a set of one or more selected instructions that match the instruction query 332 are returned to the select instructions component 329. The selected instructions 336 are a subset of the templatized instructions that are selected from the plan generation instruction library 334 as relevant to the possible functions 312, possible resources 328, and function dependency data 320 based on the instruction query 332. The selected instructions 336 are included in the plan generation prompt 338 so that when the large language model 116 reads and processes the plan generation prompt 338, the processing performed by the large language model 116 is constrained to the selected instructions 336 that are relevant for the possible functions 312, possible resources 328, and function dependency data 320. For instance, when the large language model processes the plan generation prompt 338, the large language model 116 only processes the selected instructions 336, e.g., only those instructions that are applicable to the possible functions 312, possible resources 328, and function dependency data 320.

The configure prompt including the instructions, possible functions, possible resources, and function dependency data component 330 includes the possible functions 312, the function dependency data 320, the possible resources 328, and the selected instructions 336 in the plan generation prompt 338. The configure plan generation prompt component 304 outputs the plan generation prompt 338 to the large language model 116.

The examples shown in FIG. 3 and the accompanying description, above are provided for illustration purposes. This disclosure is not limited to the described examples. Additional or alternative details and implementations are described herein.

Figure 4:
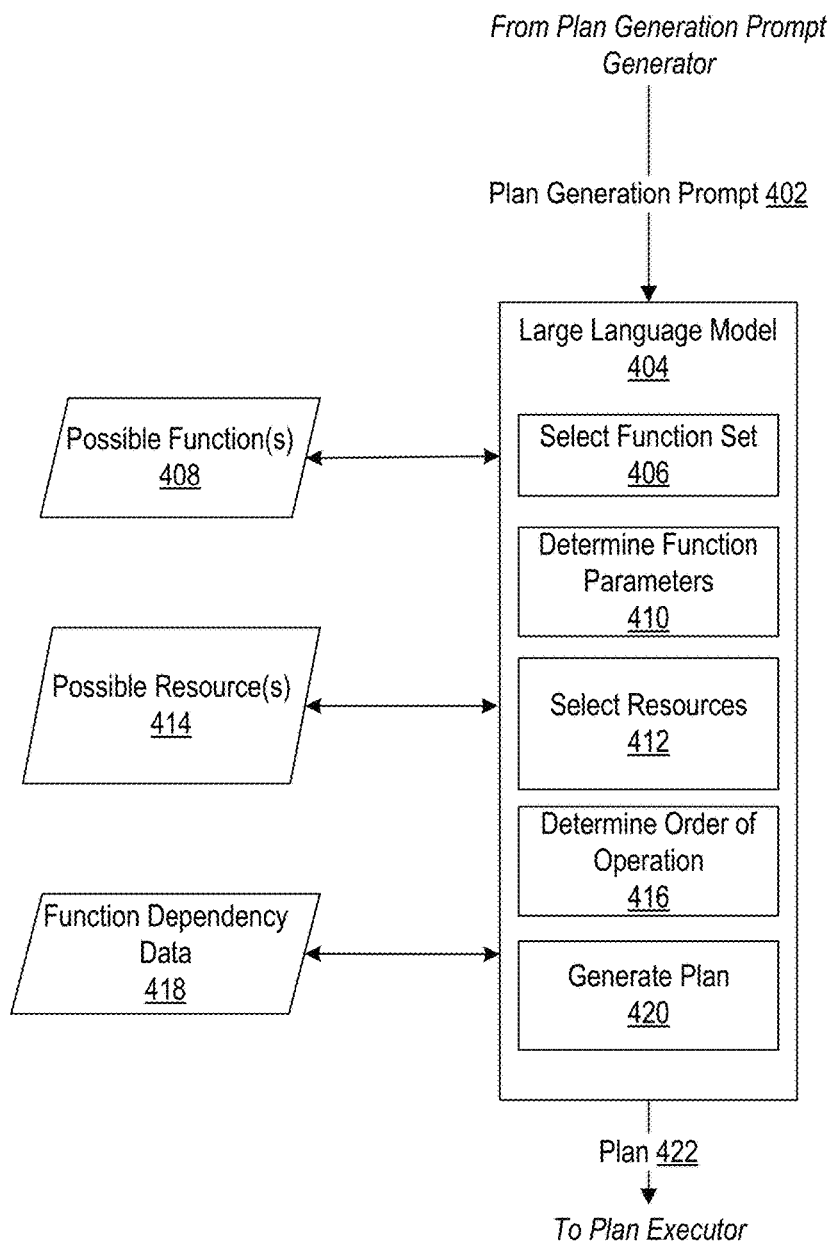
FIG. 4 is a flow diagram of an example method for generating a query plan using components of a dynamic query planning system in accordance with some embodiments of the present disclosure.

FIG. 4 is a flow diagram of an example method for generating a query plan using components of a dynamic query planning system in accordance with some embodiments of the present disclosure.

In FIG. 4, an embodiment of computing system 100 including large language model 116 is shown as a computing system 400 including large language model 404. Computing system 400 includes possible functions 408, possible resources 414, function dependency data 418, and large language model 404. Possible functions 408 include, for example, the possible functions 312 determined by the determine possible functions component 306 and included in or referenced by the plan generation prompt 338 of FIG. 3. Possible resources 414 include, for example, the possible resources 328 determined by the determine possible resources component 322 and included in or referenced by the plan generation prompt 338 of FIG. 3. Function dependency data 418 includes, for example, the function dependency data 320 determined by the obtain function dependency data component 314 and included in or referenced by the plan generation prompt 338 of FIG. 3.

The large language model 404 receives a plan generation prompt 402, e.g., the plan generation prompt 338 configured by the process and components described with reference to FIG. 3. The large language model 404 reads and executes the instructions contained in the plan generation prompt 402 to generate and output a query execution plan 422 for execution by a plan executor (e.g., plan executor 126). Examples of the types of instructions that can be included in the plan generation prompt 402 and read and processed by the large language model 404 include select function set 406, determine function parameters 410, select resources 412, determine order of operation 416, and generate plan 422.

Select function set prompt section 406 includes one or more instructions that cause the large language model 404 to select a set of functions from the possible functions 408, for inclusion in the query execution plan 422. For example, select function set 406 may include one or more examples of the types of functions that are applicable to certain types of inputs or intents along with an instruction to cause the large language model 404 to select the set of functions based on the examples provided in the select function set 4056 portion of the prompt 402.

Determine function parameters prompt section 410 includes one or more instructions that cause the large language model 404 to map parameter values from the input to the corresponding function parameters, in order to, in the plan 422, configure the set of functions for execution by the executor 126. For example, determine function parameters 410 may include one or more examples of the types of parameter values that are applicable to certain functions along with an instruction to cause the large language model 404 to determine the function parameters 410 based on the examples provided in the determine function parameters 410 portion of the prompt 402.

Select resources prompt section 412 includes one or more instructions that cause the large language model 404 to select one or more resources from the possible resources 414 for inclusion in the plan 422. For example, select resources 412 may include one or more examples of the types of criteria that can be used to select resources to which the selected set of functions are to be applied, along with an instruction to cause the large language model 404 to select resources to include in the plan 422 based on the examples provided in the select resources 412 portion of the prompt 402.

Determine order of operation prompt section 416 includes one or more instructions that cause the large language model 404 to determine the order in which the selected set of functions is to be arranged in the plan 422. For example, determine order of operation 416 may include one or more conditions or constraints to be applied to the function dependency data, along with an instruction to cause the large language model 404 to arrange the selected set of functions in the plan 422 based on the conditions or constraints provided in the determine order of operation 416 portion of the prompt 402.

Generate plan 420 includes one or more instructions that cause the large language model 404 to generate and output a query execution plan including the selected function set with the corresponding function parameters and selected resources, arranged according to the determined order of operation. The large language model 404 processes the plan generation prompt 402 including the prompt sections 406, 410, 412, 416, 420, to generate and output the plan 422 for execution by, e.g., plan executor 126.

The examples shown in FIG. 4 and the accompanying description, above are provided for illustration purposes. This disclosure is not limited to the described examples. Additional or alternative details and implementations are described herein.

Figure 5A:
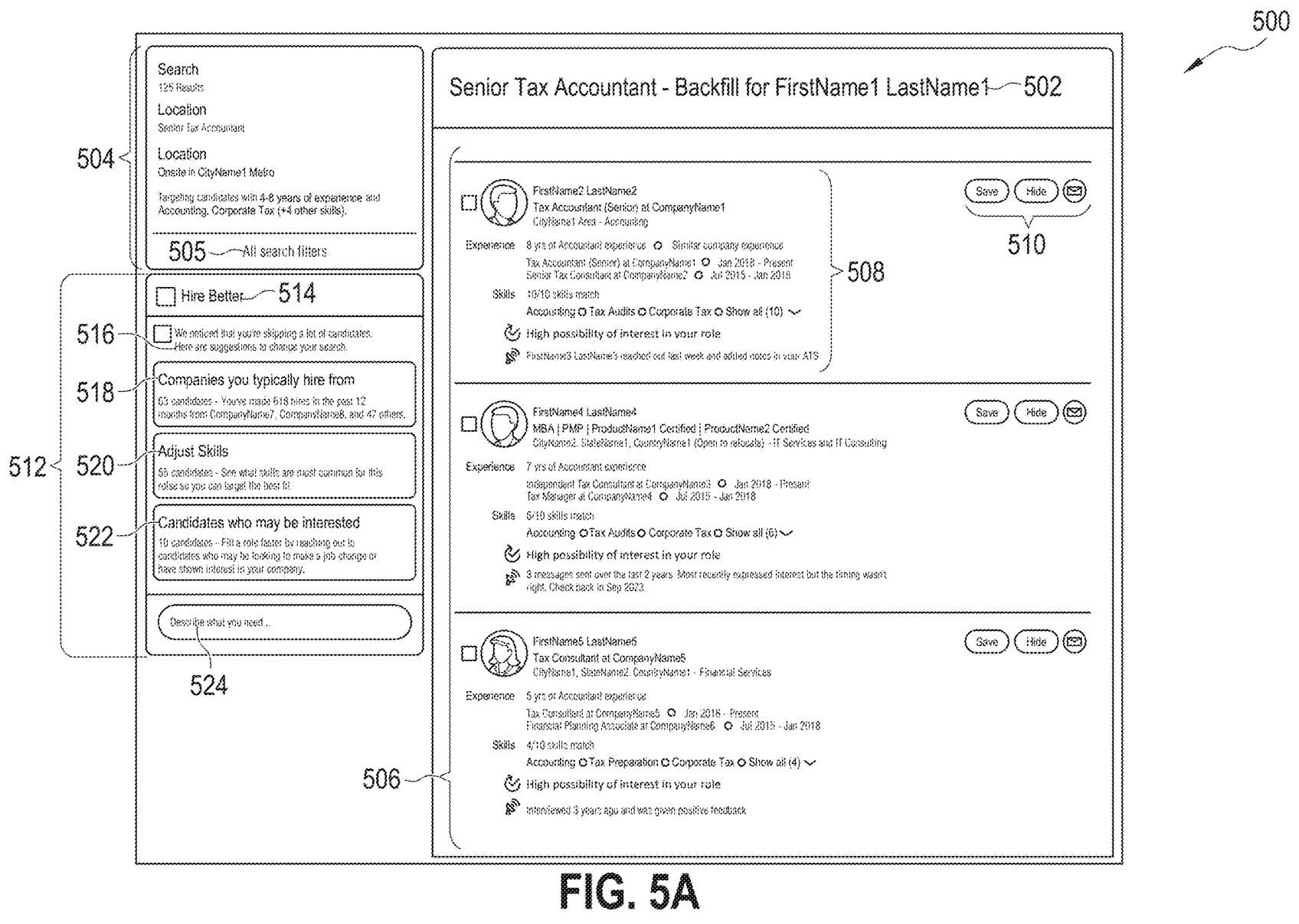

FIG. 5A illustrates an example of at least one user interface flow including a screen capture of a user interface screen for information retrieval using components of a dynamic query planning system in accordance with some embodiments of the present disclosure.

In the user interface shown in FIG. 5A, certain data that would normally be displayed may be anonymized for the purpose of this disclosure. In a live example, the actual data and not the anonymized version of the data would be displayed. For instance, the text "CompanyName" would be replaced with a name of an actual company and "FirstName LastName" would be replaced with a user's actual name.

The user interface shown in FIG. 5A is presented to a user by an application systems, such as application 102. In some implementations, the user interface is implemented as a web page that is stored, e.g., at a server or in a cache of a user device, and then loaded into a display of a user device via the user device sending a page load request to the server or fetching data from the cache.

The graphical user interface control elements (e.g., fields, boxes, buttons, etc.) shown in the screen capture are implemented via software used to construct the user interface screens. While the screen capture illustrates examples of user interface components, e.g., visual displays, buttons, input boxes, etc., this disclosure is not limited to the illustrated embodiments, or to visual displays, or to graphical user interfaces.

In FIG. 5A, a user interface 500 includes a display of search results 506 that have been returned for a user's query 502. Each search result includes profile information 508 about the entity associated with the search result (e.g., profile data for job candidates), as well as a set of action mechanisms 510 that enable the user viewing the result set 506 to perform actions in relation to the search result, such as storing the result for future use, hiding the result, and initiating the sending of a message. Selection of any of these actions can be recorded as context data that can be used by embodiments of the dynamic query planning system to configure large language model prompts.

The user interface 500 includes a display of the modified version 504 of the user's query 502, where the modified version 504 has been automatically generated using the techniques described herein. The display includes a selectable mechanism 505 by which the user can view all of the available search filters and further refine the system-generated modified version 504, e.g., by selecting or unselecting certain filters or facets. For example, using the disclosed technologies, the accounting, corporate tax, and four other skills have been automatically included in the modified version 504, and by selecting the mechanism 505 the user can deselect any of these skills and/or include different skills in the query.

User interface 500 includes a recommendation or insight section (e.g., hire better 514) 512, including recommendations 516, 518, 520, 522 for improving the user's query 502, which have been generated using the techniques described herein, are presented to the user. The items displayed in the section 512 are dynamically generated and updated as the user interacts with the search results 506 and/or modified version 504 of the user's query 502. For example, item 516 contains an insight that has been generated using the disclosed techniques based on the user's interactions with the search results including scrolling without selecting many of the search results. The items 518, 520, 522 are suggestions that have been generated using the disclosed technologies based on the insight 516 and historical interaction data, including the user's historical search and interaction data as well as aggregate historical interaction data and trends generated based on populations of users. Section 512 further includes an input mechanism 524 by which the user can provide feedback relating to the insights and/or suggestions, start a new query, or input a natural language comment, statement, or question to modify the user's query 502 or the modified version 504.

The examples shown in FIG. 5A and the accompanying description are provided for illustration purposes. For example, while the examples may be illustrated as user interface screens for a smaller form factor such as smart phones, tablet computers, or wearable devices, the user interfaces can be configured for other forms of electronic devices, such as desktop computers and/or laptop devices, or vice versa. This disclosure is not limited to the described examples. Additional or alternative details and implementations are described herein.

Figure 5B:
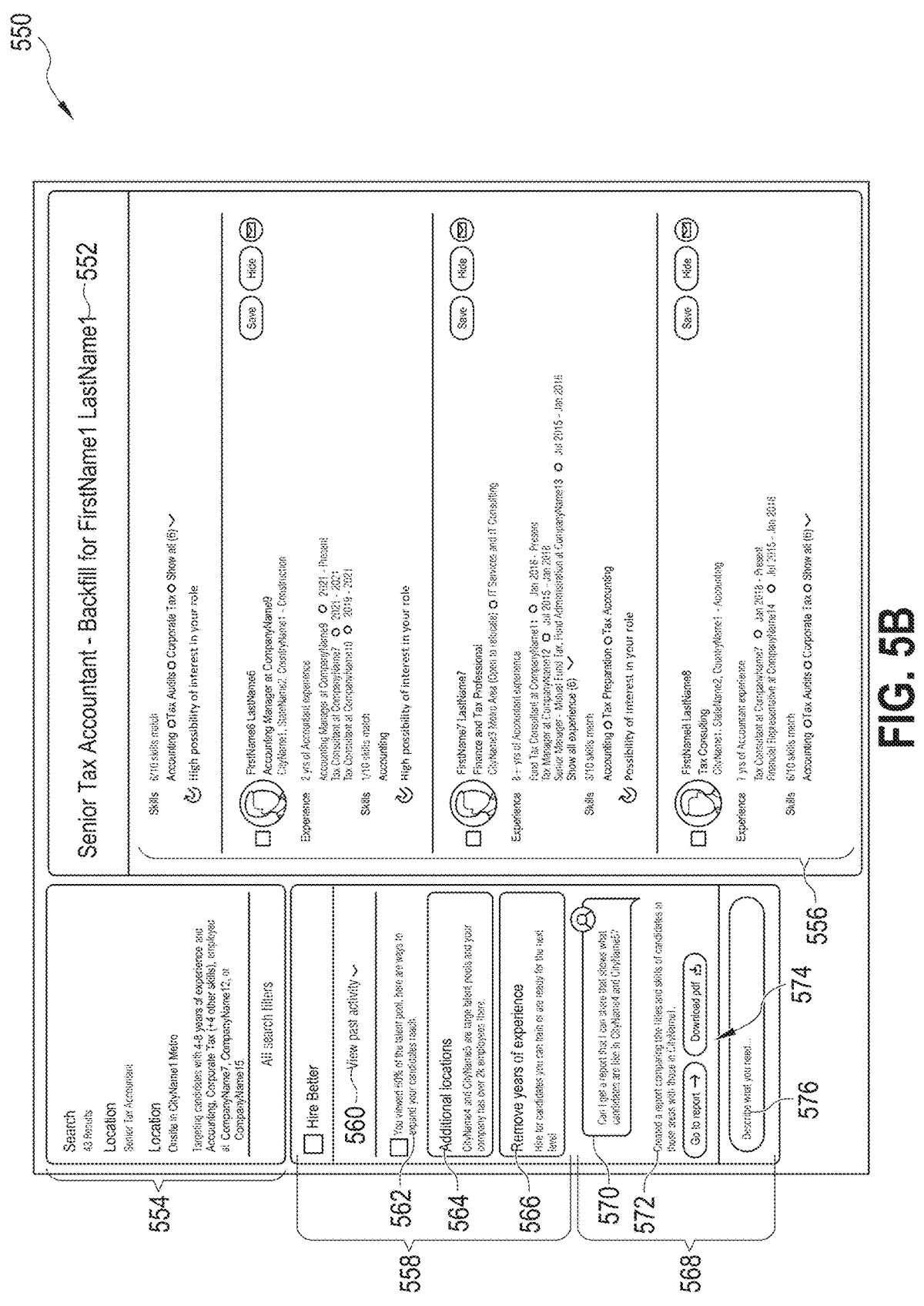

FIG. 5B illustrates an example of at least one user interface flow including a screen capture of a user interface screen for information retrieval using components of a dynamic query planning system in accordance with some embodiments of the present disclosure.

In the user interface shown in FIG. 5B, certain data that would normally be displayed may be anonymized for the purpose of this disclosure. In a live example, the actual data and not the anonymized version of the data would be displayed. For instance, the text "CompanyName" would be replaced with a name of an actual company and "FirstName LastName" would be replaced with a user's actual name.

The user interface shown in FIG. 5B is presented to a user by an application systems, such as application 102. In some implementations, the user interface is implemented as a web page that is stored, e.g., at a server or in a cache of a user device, and then loaded into a display of a user device via the user device sending a page load request to the server or fetching data from the cache.

The graphical user interface control elements (e.g., fields, boxes, buttons, etc.) shown in the screen capture are implemented via software used to construct the user interface screens. While the screen capture illustrates examples of user interface components, e.g., visual displays, buttons, input boxes, etc., this disclosure is not limited to the illustrated embodiments, or to visual displays, or to graphical user interfaces.

In FIG. 5B, a user interface 550 includes a display of search results 556 that have been returned for a user's query 552. Each search result includes profile information about the entity associated with the search result (e.g., profile data for job candidates), as well as a set of action mechanisms that enable the user viewing the result set 556 to perform actions in relation to the search result, such as storing the result for future use, hiding the result, and initiating the sending of a message. Selection of any of these actions can be recorded as context data that can be used by embodiments of the dynamic query planning system to configure large language model prompts.

The user interface 550 includes a display of a modified version 554 of the user's query 552, where the modified version 554 has been automatically generated using the techniques described herein, potentially based on user feedback. For example, in response to user feedback on the previous result set, using the disclosed technologies, company names have been automatically added to the previous modified version 504.

User interface 550 includes a recommendation or insight section 558, including insight 562 and recommendations 564, 566 for improving the user's query 552, which have been generated using the techniques described herein, are presented to the user. The items displayed in the section 558 are dynamically generated and updated as the user interacts with the search results 556 and/or modified version 554 of the user's query 552. For example, item 562 contains an insight that has been generated using the disclosed techniques based on the user's interactions with the search results including viewing several of the search results. The items 564, 566 are suggestions that have been generated using the disclosed technologies based on the insight 562 and historical interaction data, including the user's historical search and interaction data as well as aggregate historical search and interaction data and trends generated based on populations of users.

User interface 550 includes a chat section 568. The chat section 568 includes a chat style dialog box 570, a system-generated response to the user's input in the dialog box 570, including selectable action mechanisms 574, and a chat style input mechanism 576 by which the user can provide feedback relating to the system output including the insights and/or suggestions, start a new query, or input a natural language comment, statement, or question to modify the user's query 552 or the modified version 554.

As shown in FIG. 5A and FIG. 5B, the disclosed technologies are not limited to the generation of search queries, but can be used to automatically generate other kinds of helpful information in context, such as insights and recommendations.

The examples shown in FIG. 5B and the accompanying description are provided for illustration purposes. For example, while the examples may be illustrated as user interface screens for a smaller form factor such as smart phones, tablet computers, or wearable devices, the user interfaces can be configured for other forms of electronic devices, such as desktop computers and/or laptop devices, or vice versa. This disclosure is not limited to the described examples. Additional or alternative details and implementations are described herein.

FIG. 6 is a block diagram of a computing system that includes a dynamic query planning system in accordance with some embodiments of the present disclosure.

In the embodiment of FIG. 6, a computing system 600 includes one or more user systems 610, a network 620, an application system 630, a dynamic query planning system 680, a data storage system 660, and an event logging service 670.

All or at least some components of dynamic query planning system 680 are implemented at the user system 610, in some implementations. For example, portions of dynamic query planning system 680 are implemented directly upon a single client device such that communications involving applications running on user system 610 and dynamic query planning system 680 occur on-device without the need to communicate with, e.g., one or more servers, over the Internet. Dashed lines are used in FIG. 6 to indicate that all or portions of dynamic query planning system 680 can be implemented directly on the user system 610, e.g., the user's client device. In other words, both user system 610 and dynamic query planning system 680 can be implemented on the same computing device, in some implementations. In other implementations, all or portions of dynamic query planning system 680 are implemented on one or more servers and in communication with user systems 610 via network 620. Components of the computing system 600 including the dynamic query planning system 680 are described in more detail herein.

A user system 610 includes at least one computing device, such as a personal computing device, a server, a mobile computing device, a wearable electronic device, or a smart appliance, and at least one software application that the at least one computing device is capable of executing, such as an operating system or a front end of an online system. Many different user systems 610 can be connected to network 620 at the same time or at different times. Different user systems 610 can contain similar components as described in connection with the illustrated user system 610. For example, many different end users of computing system 600 can be interacting with many different instances of application system 630 through their respective user systems 610, at the same time or at different times.

User system 610 includes a user interface 612. User interface 612 is installed on user system 610 or accessible to user system 610 via network 620. Embodiments of user interface 612 include a front end portion of a search engine (e.g., search engine 640) and/or dynamic query planning system 680.

User interface 612 includes, for example, a graphical display screen that includes graphical user interface elements such as at least one input box or other input mechanism and at least one slot. A slot as used herein refers to a space on a graphical display such as a web page or mobile device screen, into which digital content such as search results, feed items, chat boxes, or threads, can be loaded for display to the user. For example, user interface 612 may be configured with a scrollable arrangement of variable-length slots that simulates an online chat or instant messaging session and/or a scrollable arrangement of slots that contain search results. The locations and dimensions of a particular graphical user interface element on a screen are specified using, for example, a markup language such as HTML (Hypertext Markup Language). On a typical display screen, a graphical user interface element is defined by two-dimensional coordinates. In other implementations such as virtual reality or augmented reality implementations, a slot may be defined using a three-dimensional coordinate system. Example screen captures of user interface screens that can be included in user interface 612 are shown in the drawings and described herein.

User interface 612 can be used to interact with one or more application systems 630 and/or to switch between applications. For example, user interface 612 enables the user of a user system 610 to create, edit, send, view, receive, process, and organize search queries, search results, content items, news feeds, and/or portions of online dialogs. In some implementations, user interface 612 enables the user to input requests (e.g., queries) for various different types of information, to initiate user interface events, and to view or otherwise perceive output such as data and/or digital content produced by, e.g., an application system 630, dynamic query planning system 680, content distribution service 638 and/or search engine 640. For example, user interface 612 can include a graphical user interface (GUI), a conversational voice/speech interface, a virtual reality, augmented reality, or mixed reality interface, and/or a haptic interface. User interface 612 includes a mechanism for entering search queries and/or selecting search criteria (e.g., facets, filters, etc.), selecting GUI user input control elements, and interacting with digital content such as search results, entity profiles, posts, articles, feeds, and online dialogs. Examples of user interface 612 include web browsers, command line interfaces, and mobile app front ends. User interface 612 as used herein can include application programming interfaces (APIs).

Network 620 includes an electronic communications network. Network 620 can be implemented on any medium or mechanism that provides for the exchange of digital data, signals, and/or instructions between the various components of computing system 600. Examples of network 620 include, without limitation, a Local Area Network (LAN), a Wide Area Network (WAN), an Ethernet network or the Internet, or at least one terrestrial, satellite or wireless link, or a combination of any number of different networks and/or communication links.

Application system 630 can include, for example, one or more online systems that provide social network services, general-purpose search engines, specific-purpose search engines, messaging systems, content distribution platforms, e-commerce software, enterprise software, or any combination of any of the foregoing or other types of software. Application system 630 includes any type of application system that provides or enables the retrieval of and interactions with at least one form of digital content, including machine-generated content via user interface 612. In some implementations, portions of dynamic query planning system 680 are components of application system 630. An application system 630 can include one or more of an entity graph 632 and/or knowledge graph 634, a user connection network 636, a content distribution service 638, a search engine 640, and/or one or more modeling systems 642.

In some implementations, a front end portion of application system 630 can operate in user system 610, for example as a plugin or widget in a graphical user interface of a web application, mobile software application, or as a web browser executing user interface 612. In an embodiment, a mobile app or a web browser of a user system 610 can transmit a network communication such as an HTTP request over network 620 in response to user input that is received through a user interface provided by the web application, mobile app, or web browser, such as user interface 612. A server running application system 630 can receive the input from the web application, mobile app, or browser executing user interface 612, perform at least one operation using the input, and return output to the user interface 612 using a network communication such as an HTTP response, which the web application, mobile app, or browser receives and processes at the user system 610.

In the example of FIG. 6, an application system 630 includes an entity graph 632 and/or a knowledge graph 634. Entity graph 632 and/or knowledge graph 634 include data organized according to graph-based data structures that can be traversed via queries and/or indexes to determine relationships between entities. For instance, entity graph 632 and/or knowledge graph 634 can be used to compute various types of relationship weights, affinity scores, similarity measurements, and/or statistics between, among, or relating to entities.

Entity graph 632, knowledge graph 634 includes a graph-based representation of data stored in data storage system 660, described herein. For example, entity graph 632, knowledge graph 634 represents entities, such as users, organizations (e.g., companies, schools, institutions), content items (e.g., job postings, announcements, articles, comments, and shares), and computing resources (e.g., databases, models, applications, and services), as nodes of a graph. Entity graph 632, knowledge graph 634 represents relationships, also referred to as mappings or links, between or among entities as edges, or combinations of edges, between the nodes of the graph. In some implementations, mappings between different pieces of data used by an application system 630 are represented by one or more entity graphs. In some implementations, the edges, mappings, or links indicate relationships, online interactions, or activities relating to the entities connected by the edges, mappings, or links. For example, if a user clicks on a search result, an edge may be created connecting the user entity with the search result entity in the entity graph, where the edge may be tagged with a label such as "viewed." If a user viewing a list of search results skip over a search result without clicking on the search result, an edge may not be created between the user entity and the search result entity in the entity graph.

Portions of entity graph 632, knowledge graph 634 can be automatically re-generated or updated from time to time based on changes and updates to the stored data, e.g., updates to entity data and/or activity data. Also, entity graph 632, knowledge graph 634 can refer to an entire system-wide entity graph or to only a portion of a system-wide graph. For instance, entity graph 632, knowledge graph 634 can refer to a subset of a system-wide graph, where the subset pertains to a particular user or group of users of application system 630.

Knowledge graph 634 includes a graph-based representation of data stored in data storage system 660, described herein. Knowledge graph 634 represents relationships, also referred to as links or mappings, between entities or concepts as edges, or combinations of edges, between the nodes of the graph. In some implementations, mappings between different pieces of data used by application system 630 or across multiple different application systems are represented by the knowledge graph 634.

In some implementations, knowledge graph 634 is a subset or a superset of entity graph 632. For example, in some implementations, knowledge graph 634 includes multiple different entity graphs 632 that are joined by cross-application or cross-domain edges. For instance, knowledge graph 634 can join entity graphs 632 that have been created across multiple different databases or across different software products. In some implementations, the entity nodes of the knowledge graph 634 represent concepts, such as product surfaces, verticals, or application domains. In some implementations, knowledge graph 634 includes a platform that extracts and stores different concepts that can be used to establish links between data across multiple different software applications. Examples of concepts include topics, industries, and skills. As with other portions of entity graph 632, knowledge graph 634 can be used to compute various types of relationship weights, affinity scores, similarity measurements, and/or statistical correlations between or among entities and/or concepts.

In the example of FIG. 6, application system 630 includes a user connection network 636. User connection network 636 includes, for instance, a social network service, professional social network system and/or other social graph-based applications. Content distribution service 638 includes, for example, a feed, chatbot or chat-style system, or a messaging system, such as a peer-to-peer messaging system that enables the creation and exchange of messages between users of application system 630 and the application system 630. Search engine 640 includes a search engine that enables users of application system 630 to input and execute search queries to retrieve information from one or more sources of information, such as user connection network 636, entity graph 632, knowledge graph 634, one or more data stores of data storage system 660, or one or more data resources 650.

In the example of FIG. 6, application system 630 includes a content distribution service 638. The content distribution service 638 can include a data storage service, such as a web server, which stores digital content items, and transmits digital content items to users via user interface 612. In some embodiments, content distribution service 638 processes requests from, for example, application system 630 and/or dynamic query planning system 680, and distributes digital content items to user systems 610 in response to requests. For instance, aspects of the dynamic query planning system 680 can be applied to queries that are designed to populate a user's feed with content items obtained via content distribution service 638. In other words, aspects of the dynamic query planning system 680 can be applied to system-generated queries alternatively or in addition to user-generated queries.

A request includes, for example, a network message such as an HTTP (HyperText Transfer Protocol) request for a transfer of data from an application front end to the application's back end, or from the application's back end to the front end, or, more generally, a request for a transfer of data between two different devices or systems, such as data transfers between servers and user systems. A request is formulated, e.g., by a browser or mobile app at a user device, in connection with a user interface event such as a login, click on a graphical user interface element, an input of a search query, or a page load. In some implementations, content distribution service 638 is part of application system 630. In other implementations, content distribution service 638 interfaces with application system 630 and/or dynamic query planning system 680, for example, via one or more application programming interfaces (APIs).

In the example of FIG. 6, application system 630 includes a search engine 640. Search engine 640 includes a software system designed to search for and retrieve information by executing queries on one or more data stores, such as databases, connection networks, and/or graphs. The queries are designed to find information that matches specified criteria, such as keywords and phrases contained in user input and/or system-generated queries. For example, search engine 640 is used to retrieve data in response to user input and/or system-generated queries, by executing queries on various data stores of data storage system 660 and/or data resources 650, or by traversing entity graph 632, knowledge graph 634.

Data resources 650 include computing resources that can be queried to retrieve information, such as query terms that can be used to supplement or modify query terms input by a user. Data resources 650 can include computing resources that are internal to application system 630 or external to application system 630. Examples of data resources 650 include entity graphs, knowledge graphs, indexes, databases, networks, applications, models (e.g., large language models and/or other artificial intelligence models or machine learning models), taxonomies, data services, web pages, vectors (e.g., data stores that store embeddings), and searchable digital catalogs. Each data resource 650 enables dynamic query planning system 110 to access the data resource, for example by providing an application programming interface (API). Each data resource 650 can include a monitoring service that periodically generates, publishes, or broadcasts availability and/or other performance metrics associated with the data resource. For example, each data resource 650 can provide a set of APIs that can be used by dynamic query planning system 110 to query the data resource, obtain data from the data resource, and/or obtain performance metrics for the data resource.

AI model service 690 includes one or more artificial intelligence-based models, such as large language model 116 and/or other types of models including discriminative and/or generative models, neural networks and/or other types of machine learning-based models, probabilistic models, statistical models, transformer-based models, and/or any combination of any of the foregoing. AI model service 690 enables dynamic query planning system 110 to access to these models, for example by providing an application programming interface (API). AI model service 690 can include a monitoring service that periodically generates, publishes, or broadcasts latency and/or other performance metrics associated with the models. For example, AI model service 690 can provide a set of APIs that can be used by dynamic query planning system 110 to obtain performance metrics for the large language model 116.

Event logging service 670 captures and records network activity data generated during operation of application system 630 and/or dynamic query planning system 680, including user interface events generated at user systems 610 via user interface 612, in real time, and formulates the user interface events and/or other network activity data into a data stream that can be consumed by, for example, a stream processing system. Examples of network activity data include logins, page loads, input of search queries or query terms, selections of facets or filters, clicks on search results or graphical user interface control elements, scrolling lists of search results, and social action data such as likes, shares, comments, and social reactions (e.g., "insightful," "curious," etc.). For instance, when a user of application system 630 via a user system 610 enters input or clicks on a user interface element, such as a search result, or a user interface control element such as a view, comment, share, or reaction button, or uploads a file, or inputs a query, or scrolls through a feed, etc., event logging service 670 fires an event to capture and store log data including an identifier, such as a session identifier, an event type, a date/timestamp at which the user interface event occurred, and possibly other information about the user interface event, such as the impression portal and/or the impression channel involved in the user interface event. Examples of impression portals and channels include, for example, device types, operating systems, and software platforms, e.g., web applications and mobile applications.

For instance, when a user enters input or reacts to system-generated output, such as a list of search results, event logging service 670 stores the corresponding event data in a log. Event logging service 670 generates a data stream that includes a record of real-time event data for each user interface event that has occurred. Event data logged by event logging service 670 can be pre-processed and anonymized as needed so that it can be used as context data to, for example, configure one or more instructions for one or more artificial intelligence models (e.g., large language models), or to modify weights, affinity scores, or similarity measurements that are assigned by the dynamic query planning system to search results or data resources.

Data storage system 660 includes data stores and/or data services that store digital data received, used, manipulated, and produced by application system 630 and/or dynamic query planning system 680, including contextual data, state data, prompts and/or prompt templates for generative artificial intelligence models or large language models, user inputs, system-generated outputs, metadata, attribute data, activity data.

In the example of FIG. 6, data storage system 660 includes an entity data store 662, an activity data store 664, a prompt data store 666, and a context data store 668. Entity data store 662 stores data, such as profile data or metadata, relating to users, companies, jobs, computing resources, and/or other entities. Activity data store 664 stores data relating to network activity, e.g., user interface event data extracted from one or more application systems 630 and/or dynamic query planning system 680 by event logging service 670. Prompt data store 666 stores prompt templates and/or prompts which include one or more instructions that can be input to one or more artificial intelligence models (e.g., generative models, large language models). Context data store 668 stores data relating to the current state of a user system or application, including the current state of various applications that may be running on the user system, such as the current state of a search engine, data resource, and/or dynamic query planning system. While shown in FIG. 6 as components of a data storage system 660, all or portions of each or any of the entity data store 662, activity data store 664, prompt data store 666, and/or context data store 668 are implemented on the user system 610 in some embodiments. For example, a data store can include a volatile memory such as a form of random access memory (RAM) available on user system 610 for storing state data generated at the user system 610 or an application system 630. As another example, in some implementations, a separate, personalized version of each or any of the entity data store 662, activity data store 664, prompt data store 666, and/or context data store 668 is created for each user such that data is not shared between or among the separate, personalized versions of the data stores.

In some embodiments, data storage system 660 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine. Data stores of data storage system 660 can be configured to store data produced by real-time and/or offline (e.g., batch) data processing. A data store configured for real-time data processing can be referred to as a real-time data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 660 resides on at least one persistent and/or volatile storage device that can reside within the same local network as at least one other device of computing system 600 and/or in a network that is remote relative to at least one other device of computing system 600. Thus, although depicted as being included in computing system 600, portions of data storage system 660 can be part of computing system 600 or accessed by computing system 600 over a network, such as network 620.

While not specifically shown, it should be understood that any of user system 610, application system 630, data resources 650, dynamic query planning system 680, data storage system 660, and event logging service 670 includes an interface embodied as computer programming code stored in computer memory that when executed causes a computing device to enable bidirectional communication with any other of user system 610, application system 630, data resources 650, dynamic query planning system 680, data storage system 660, and event logging service 670 using a communicative coupling mechanism. Examples of communicative coupling mechanisms include network interfaces, inter-process communication (IPC) interfaces and application program interfaces (APIs).

Each of user system 610, application system 630, data resources 650, dynamic query planning system 680, data storage system 660, and event logging service 670 is implemented using at least one computing device that is communicatively coupled to electronic communications network 620. Any of user system 610, application system 630, data resources 650, dynamic query planning system 680, data storage system 660, and event logging service 670 can be bidirectionally communicatively coupled by network 620. User system 610 as well as other different user systems (not shown) can be bidirectionally communicatively coupled to application system 630 and/or dynamic query planning system 680.

A typical user of user system 610 can be an administrator or end user of application system 630 or dynamic query planning system 680. User system 610 is configured to communicate bidirectionally with any of application system 630, dynamic query planning system 680, data resources 650, data storage system 660, and event logging service 670 over network 620.

Terms such as component, system, and model as used herein refer to computer implemented structures, e.g., combinations of software and hardware such as computer programming logic, data, and/or data structures implemented in electrical circuitry, stored in memory, and/or executed by one or more hardware processors.

The features and functionality of user system 610, application system 630, dynamic query planning system 680, data resources 650, data storage system 660, and event logging service 670 are implemented using computer software, hardware, or software and hardware, and can include combinations of automated functionality, data structures, and digital data, which are represented schematically in the figures. User system 610, application system 630, dynamic query planning system 680, data resources 650, data storage system 660, and event logging service 670 are shown as separate elements in FIG. 6 for ease of discussion but, except as otherwise described, the illustration is not meant to imply that separation of these elements is required. The illustrated systems, services, and data stores (or their functionality) of each of user system 610, application system 630, dynamic query planning system 680, data resources 650, data storage system 660, and event logging service 670 can be divided over any number of physical systems, including a single physical computer system, and can communicate with each other in any appropriate manner.

Figure 8:
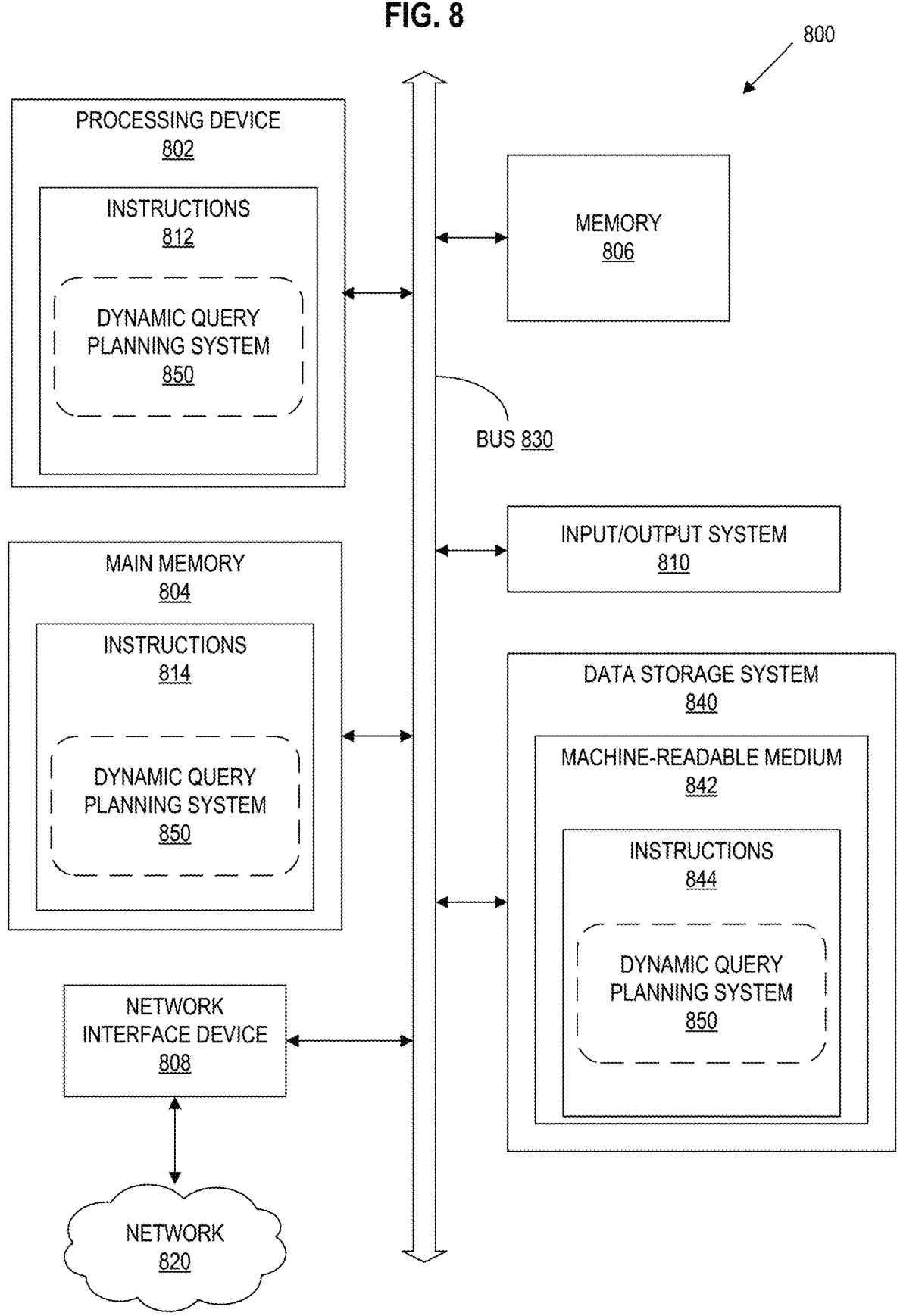
FIG. 8 is a block diagram of an example computer system including components of a dynamic query planning system in accordance with some embodiments of the present disclosure.

In the embodiment of FIG. 8, portions of dynamic query planning system 680 that may be implemented on a front end system, such as one or more user systems, and portions of dynamic query planning system 680 that may be implemented on a back end system such as one or more servers, are collectively represented as dynamic query planning system 850 for ease of discussion only. For example, portions of dynamic query planning system 680 are not required to be implemented all on the same computing device, in the same memory, or loaded into the same memory at the same time. For instance, access to portions of dynamic query planning system 680 can be limited to different, mutually exclusive sets of user systems and/or servers. For instance, in some implementations, a separate, personalized version of dynamic query planning system 680 is created for each user of the dynamic query planning system 680 such that data is not shared between or among the separate, personalized versions of the dynamic query planning system 680. Additionally, certain portions of dynamic query planning system 680 typically may be implemented on user systems while other portions of dynamic query planning system 680 typically may be implemented on a server computer or group of servers. In some embodiments, however, one or more portions of dynamic query planning system 680 are implemented on user systems. For example, dynamic query planning system 680 is entirely implemented on user systems, e.g., client devices, in some implementations. For instance, a version of dynamic query planning system 680 can be embedded in a client device's operating system or stored at the client device and loaded into memory at execution time. Further details with regard to the operations of dynamic query planning system 850 are described herein.

Figure 7A:
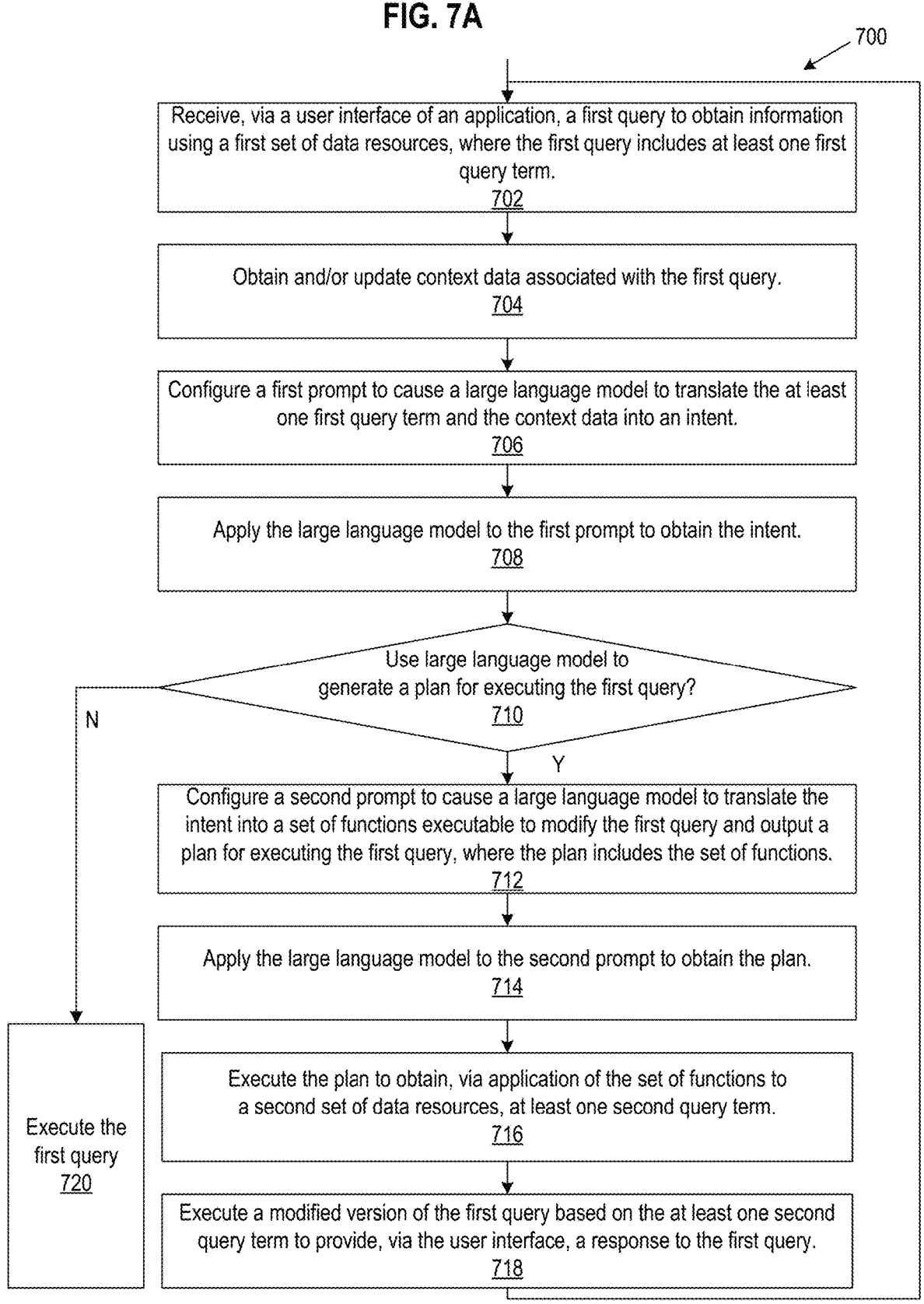
FIG. 7A is a flow diagram of an example method for dynamic query planning using components of a dynamic query planning system in accordance with some embodiments of the present disclosure.

FIG. 7A is a flow diagram of an example method for dynamic query planning using components of a dynamic query planning system in accordance with some embodiments of the present disclosure.

The method 700 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by one or more components of dynamic query planning system 110 of FIG. 1A or dynamic query planning system 680 of FIG. 6. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In accordance with the method 700, a large language model is selectively invoked to generate a query execution plan for processing a user input including a search query. At operation 702, the processing device receives a first query to obtain information using a first set of data resources. The first query is received via a user interface of an application, such as a job search application or a job candidate search application. The first query includes at least one first query term. For example, the first query could be a conversational natural language input provided by a user, and the first query term could be a word or phrase contained in the conversational natural language input. Operation 702 is performed, for example, by the embodiment of dynamic query planning system 110 in communication with application 102 of FIG. 1A and FIG. 1B, described herein.

At operation 704, the processing device obtains and/or updates context data associated with the first query. For example, the processing device obtains context data that indicates which of multiple applications, application pages, or user interface mechanisms the user is currently interacting with. For instance, an application can have multiple different search mechanisms such as a company search and a user profile search, and the context data could indicate that the user is currently interacting with the user profile search mechanism. The context data can also include information about the user's previous interactions with the user interface. For instance, the context data can include information about search results that the user interacted with or scrolled past. At operation 704, the context data can be updated upon each iteration of the method 700. For example, context data can continue to be obtained at operation 704 while the user continues to interact with the user interface, e.g., while the user continues to interact with search results or refine the search query (e.g., by selecting or deselecting facets or filters). Operation 704 is performed, for example, by the embodiment of dynamic query planning system 110 in communication with application 102 of FIG. 1A and FIG. 1B, described herein.

At operation 706, the processing device configures a first prompt to cause a large language model to translate the at least one first query term and the context data into an intent. Intent, as used herein, may refer to a structured representation of a user input. To configure the first prompt, operation 706 can, for example, merge the user input received at operation 702 and the context data obtained at operation 704 with a pre-created prompt or prompt template for input classification to create the first prompt. For instance, operation 706 can map portions of the user input and/or context data to corresponding portions of the pre-created prompt or prompt template (e.g., as parameters or arguments) or apply one or more rules to one or more portions of the user input and/or context data that, based on the application of the one or more rules, include certain pre-created sections in the first prompt or exclude certain pre-created sections from the first prompt. Operation 706 is performed, for example, by the input classification prompt generator 112 of dynamic query planning system 110, e.g., the embodiment of the input classification prompt generator 112 shown in FIG. 2, described herein.

At operation 708, the processing device applies the large language model to the first prompt configured at operation 706 to obtain, from the large language model, the intent. As a result of operation 708, the large language model executes the one or more instructions contained in the first prompt to classify the user input into an intent based on the context data and the instructions contained in the first prompt. To classify the user input, the large language model maps the user input to an intent in accordance with the context data and the instructions contained in the first prompt. For example, the first prompt may instruct the large language model to select an intent from a set of pre-defined intents based on similarity of the intent to the user input given the context data. Operation 708 is performed, for example, by the dynamic query planning system 110 in communication with the large language model 116 of FIG. 1A and FIG. 1B, described herein.

At operation 710, the processing device determines whether to use the large language model to generate a plan for executing the first query. For example, the processing device may determine not to use the large language model to generate a plan if resolution of the intent determined at operation 708 does not require the execution of multiple functions. For instance, if the user's query is unambiguous, e.g., the query only contains selected facets and does not contain any natural language input that requires modification or expansion, the processing device may determine not to use the large language model to generate a plan. If the processing device at operation 710 determines not to use the large language model to generate a plan, the processing device proceeds to operation 720 where the processing device may simply execute the first query using a function based on the intent. As another example, the processing device may determine not to use the large language model if the context data obtained at operation 704 indicates that the latency associated with the large language model exceeds a maximum threshold latency value, or that some other performance metric associated with the large language model exceeds a maximum value or falls below a minimum value.

At operation 710, the processing device determines to use the large language model to generate a plan for executing the first query if, for example, resolution of the intent determined at operation 708 requires the execution of multiple functions. For instance, if the user's query contains one or more query terms that do not map to any pre-defined facets or filters, the processing device may determine to use the large language model to generate a plan for executing the query. As another example, the processing device at operation 710 may determine to use the large language model if the context data obtained at operation 704 indicates that the a current value of the latency associated with the large language model does not exceed a maximum threshold latency value, or that a current value of some other performance metric associated with the large language model does not exceed a maximum threshold value or does not fall below a minimum threshold value. References herein to threshold values indicate values that are configurable based on the requirements of a particular design or implementation. For example, a threshold value can be configured or adjusted based on, for example, the type or version of large language model used, the network configuration and/or server configuration.

If the processing device at operation 710 determines to use the large language model to generate a plan, the processing device proceeds to operation 712. At operation 712, the processing device configures a second prompt to cause a large language model to translate the intent obtained at operation 708 into a set of functions that can be executed to modify the first query and output a plan for executing the first query, where the plan is to include the set of functions. To configure the second prompt, operation 708 can, for example, merge the user input received at operation 702, the context data obtained at operation 704, and the intent obtained at operation 708 with a pre-created prompt or prompt template for query plan generation. For instance, operation 708 can use the intent to select the set of functions, map portions of the user input and/or context data to corresponding portions of the selected set of functions (e.g., as parameter values or arguments) and merge the selected set of functions including the respective user input and/or context data with a pre-created prompt or prompt template. Alternatively or in addition, the processing device at operation 712 can apply one or more rules to the user input, the intent, the set of functions, and/or the context data such that certain pre-created prompt sections are included in the first prompt or excluded from the first prompt. For example, based on one or more of the user input, the intent, the set of functions, and/or the context data, the processing device at operation 712 can include in the second prompt instructions to cause the large language model to determine an order of operation for the functions in the set of functions and to order the functions according to the order of operation in the plan. Operation 712 is performed, for example, by the plan generation prompt generator 120 of dynamic query planning system 110, e.g., the embodiment of the plan generation prompt generator 120 shown in FIG. 3, described herein.

At operation 714, the processing device applies the large language model to the second prompt configured at operation 712 to obtain the plan. As a result of operation 714, the large language model executes the one or more instructions contained in the second prompt to generate a query execution plan for the first query based on the user input, the context data, the set of functions determined at operation 712. For example, to generate the plan, the large language model executes the instructions contained in the second prompt to select the set of functions, map the corresponding portions of the user input and/or context data to the respective functions (e.g., as parameters or arguments), determine the order of operation for the set of functions, arrange the functions according to the order of operation, and output the plan. Operation 714 is performed, for example, by the large language model 116 in communication with the dynamic query planning system 110, e.g., the example operation of the large language model 116 shown in FIG. 4, described herein.

At operation 716, the processing device executes the plan generated and output by the large language model at operation 714. Via execution of the plan, the processing device obtains, as a result of the application of the set of functions contained in the plan to a set of data resources, at least one second query term. The at least one second query term is related to but different from the at least one first query term, and is obtained by executing the set of functions using one or more data resources. For example, the at least one second query term includes one or more facet values or filters that are related to the user input, the context data, and/or the intent, where the facet values or filters are obtained by querying one or more data resources such as an entity graph, a knowledge graph, a data base, an application, or an artificial intelligence model such as a generative model. Operation 716 is performed, for example, by the executor 126 of the dynamic query planning system 110 in communication with one or more data resources 134 of FIG. 1A or one or more data resources 176 of FIG. 1B, described herein.

At operation 718, the processing device executes a second query based on the at least one second query term to provide, via the user interface, a response to the first query. For example, at operation 718, the processing device formulates the second query to include the at least one second query term and applies the second query to one or more data resources (e.g., one or more of data resources 134 or data resources 176) to obtain a result set, and then formulates the response based on the result set. Operation 718 is performed, for example, by the executor 126 of the dynamic query planning system 110 in communication with one or more data resources 134 of FIG. 1A or one or more data resources 176 of FIG. 1B, described herein.

Following operation 718, the processing device returns to operation 702 or (not specifically shown) operation 704, to obtain additional user input and/or additional context data, configure one or more modified prompts based on the additional user input and/or additional context data, and generate and output one or more modified responses based on the one or more modified prompts. In other words, the method 700 can be repeated iteratively as the processing device obtains additional user input and/or additional context data. The method 700 can make the determination as to whether to use the large language model independently on each iteration, e.g., the large language model may be used to generate a query execution plan on a first iteration but not used to generate a query execution plan on a second iteration.

The examples shown in FIG. 7A and the accompanying description, above are provided for illustration purposes. This disclosure is not limited to the described examples.

FIG. 7B is a flow diagram of an example method for dynamic query planning using components of a dynamic query planning system in accordance with some embodiments of the present disclosure.

The method 750 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 750 is performed by one or more components of dynamic query planning system 110 of FIG. 1A or dynamic query planning system 680 of FIG. 6. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In accordance with the method 750, a large language model is used to generate a query execution plan for processing a user input including a search query. At operation 752, the processing device receives, via a user interface of an application, a first query that includes a user request for information retrievable using a first set of data resources, where the first query includes at least one first query term. For example, the first query could be a conversational natural language input provided by a user, and the first query term could be a word or phrase contained in the conversational natural language input. The first set of data resources includes one or more data resources from which information may be retrieved to respond to the first query. For example, if the first query is a job search, the first set of data resources may include one or more databases that store job profiles or job postings. If the first query is a company search, the first set of data resources may include an entity graph that contains information about companies and relationships between companies. Operation 752 is performed, for example, by an embodiment of dynamic query planning system 110 in communication with application 102 of FIG. 1A and FIG. 1B, described herein.

At operation 754, the processing device configures at least one prompt to cause a large language model to translate the at least one first query term received at operation 752 into a set of functions that can be executed to obtain at least one second query term using a second set of data resources, and generate and output a plan that is executable to create a modified version of the first query based on the at least one second query term. For example, the processing device at operation 754 may configure a single prompt to cause the large language model to generate and output a query execution plan, or multiple prompts to classify the user input and generate the query execution plan, or multiple prompts to generate the query execution plan. The second set of data resources includes one or more data resources from which information, such as facet values and/or filter values, can be obtained to create a modified version of the first query. For example, if the first query contains the phrase "fortune 500 companies," the second set of data resources includes at least one data resource that contains a list of all of the names of companies that are currently in the Fortune 500 list. The second set of resources and the first set of data resources may include one or more of the same data resources or may be different data resources. Operation 754 is performed, for example, by an embodiment of the dynamic query planning system 110 shown in FIGS. 1A and 1B, described herein, which includes plan generation prompt generator 120 and/or input classification prompt generator 112, or which may implement the input classification approach shown in FIG. 3 and/or the plan generation approach shown in FIG. 4.

At operation 756, the processing device applies the large language model to the at least one prompt configured at operation 754 to obtain the plan for executing the first query. As a result of operation 756, the large language model executes the one or more instructions contained in the at least one prompt to, e.g., classify the user input into an intent and/or generate and output the query execution plan. Operation 756 is performed, for example, by the dynamic query planning system 110 in communication with the large language model 116 of FIG. 1A and FIG. 1B, described herein.

At operation 758, the processing device executes the plan generated and output by the large language model at operation 756 to determine the at least one second query term (e.g., supplemental query terms, facets, or filters), and to create the modified version of the first query based on the at least one second query term. Via execution of the plan, the processing device obtains, as a result of the application of the set of functions contained in the plan to the second set of data resources, at least one second query term. The at least one second query term is related to but different from the at least one first query term, and is obtained by executing the set of functions using one or more second data resources. For example, the at least one second query term includes one or more facet values or filters that are related to the user input, the context data, and/or the intent, where the facet values or filters are obtained by querying one or more data resources such as an entity graph, a knowledge graph, a database, an application, or an artificial intelligence model such as a generative model. Operation 716 is performed, for example, by the executor 126 of the dynamic query planning system 110 in communication with one or more data resources 134 of FIG. 1A or one or more data resources 176 of FIG. 1B, described herein.

At operation 760, the processing device executes the modified version of the first query created at operation 758 based on the at least one second query term to provide, via the user interface, a response to the first query. For example, at operation 760, the processing device formulates the modified version of the first query to include the at least one second query term and applies the modified version of the first query to one or more data resources (e.g., one or more of data resources 134 or data resources 176) to obtain a result set, and then formulates the response based on the result set. Operation 760 is performed, for example, by the executor 126 of the dynamic query planning system 110 in communication with one or more data resources 134 of FIG. 1A or one or more data resources 176 of FIG. 1B, described herein.

While not specifically shown in FIG. 7B, following operation 760, the processing device can return to operation 752 or operation 754, to obtain additional user input and/or additional context data, configure one or more modified prompts based on the additional user input and/or additional context data, and generate and output one or more modified responses based on the one or more modified prompts. In other words, the method 750 can be repeated iteratively as the processing device obtains additional user input and/or additional context data. The method 750 can make a determination as to whether to use the large language model for input classification and/or plan generation independently on each iteration, e.g., the large language model may be used to generate a query execution plan on a first iteration but not used to generate a query execution plan on a second iteration, or the large language model may be used for input classification but not for query plan generation, or the large language model may be used for query plan generation but not for input classification.

In some implementations, the method 750 includes configuring the at least one prompt to cause the large language model to select at least one data resource of the second set of data resources based on the first query term and configure at least one function of the set of functions to obtain the at least one second query term from the selected at least one data resource. For example, if the first query term indicates that the user is looking for jobs that match a certain criteria, the at least one prompt is configured to cause the large language model to choose a data resource from among only those data resources that can supply information about available jobs. Also, the at least one prompt is configured to cause the large language model to configure at least one function so that when the at least one function is executed using the selected data resource, the at least one second query term is retrieved from the selected data resource.

In some implementations, the method 750 includes assigning different weights to at least first and second data resources of the second set of data resources based on at least one of metadata or performance data or feedback associated with the at least first and second data resources, and configuring the at least one prompt to cause the large language model to (i) select a data resource of the at least first and second data resources based on the weights, and (ii) configure at least one function of the set of functions to obtain the at least one second query term from the selected data resource. For example, metadata associated with a data resource can include an indication of the type of information that can be retrieved from the data resource or the format of the information stored in the data resource (e.g., text, images, video, audio, etc.). Performance data associated with a data resource can include information about the availability of or latency associated with use of the data resource. Feedback can include historical data about user reactions to presentations of information retrieved from the data source (e.g., likes, comments, shares, etc.). These factors can be employed to assign or adjust the weights assigned to the data resources, and the at least one prompt can instruct the large language model to compare the weights and select the data resource having, e.g., the highest weight value or lowest weight value, as the case may be.

In some implementations, the method 750 includes determining whether the first query translates to a plurality of functions; and responsive to determining that the first query translates to the plurality of functions, formulating the modified version of the first query using the plan obtained from the large language model; or responsive to determining that the first query does not translate to the plurality of functions, skipping the configuring, the applying, the executing the plan, and the executing the modified version of the first query. For example, the steps involved in using the large language model to generate an execution plan for the user's query can be avoided or skipped if the user's query is simple or straightforward (e.g., translates to only one function). The large language model can be invoked if the user's query translates to multiple functions.

In some implementations, the method 750 includes determining a value of at least one performance metric associated with the large language model; and responsive to determining that the value of the at least one performance metric exceeds a maximum threshold value or does not exceed a minimum threshold value, configuring the at least one prompt to reduce at least one of the number of prompts contained in the at least one prompt or the number of communications with the large language model to obtain the plan or the number of instructions included in the at least one prompt to obtain the plan. For example, a prompt can be simplified (e.g., to reduce the number of examples, questions, or statements contained in the prompt) or the number of prompts can be reduced, or the number of communications with the large language model can be reduced, if the performance metric falls outside of a desired performance range for the large language model (e.g., if latency is too high, etc.). As another example, a zero-shot prompt can be used instead of a few-shot prompt, or the number of examples provided in a few-shot prompt can be reduced, or a few-shot prompt can be used instead of a multi-step prompt, prompt chaining, or a chain-of-thought prompt. As yet another example, one or more prompt parameters can be adjusted based on the performance metrics.

In some implementations, the method 750 includes obtaining context data associated with at least one of the user input or the response, where the context data includes data relating to at least one of: a state of the user interface, a state of the application, configuration data associated with a client device running the user interface, a current use of the application by a user, historical use of the application, profile data associated with the user, activity data associated with the user, data extracted from an entity graph, usage statistics associated with at least one of the user interface or the application, or performance data associated with at least one of the user interface, the application, the set of second data resources, or the large language model; modifying the at least one prompt based on the context data to include at least one instruction to cause the large language model to generate and output a modified version of the plan, the modified version of the plan executable to formulate at least one natural language recommendation for modifying the first query; applying the large language model to the modified at least one prompt to obtain, from the large language model, the modified version of the plan; executing the modified version of the plan to obtain the at least one natural language recommendation for modifying the first query; and providing, via the user interface, the at least one natural language recommendation for modifying the query. For example, context data can be continuously monitored during a user's session and prompts can be refined or modified as additional context data is obtained, so that the instructions to the large language model change as a result of the context data, which then can result in the large language model producing a different or modified plan, such as a plan that can be executed to produce natural language recommendations or insights rather than query results.

In some implementations, configuring the at least one prompt includes configuring at least one instruction to identify a plurality of functions related to context data associated with at least one of the user interface or the application and cause the large language model to select the set of functions from the plurality of functions based on the context data associated with at least one of the user interface or the application. For example, the prompt identifies a library of available functions to the large language model and instructs the large language model to select a subset of all of the available functions, e.g., to select only those functions that match the context data.

In some implementations, configuring the at least one prompt includes determining a value of at least one performance metric associated with the large language model; and responsive to determining that the value of the at least one performance metric does not exceed a maximum threshold value or exceeds a minimum threshold value, (i) configuring a first instruction to cause the large language model to translate the first query into a structured representation of the first query, (i) configuring a second instruction to cause the large language model to generate the plan based on the structured representation of the first query, and (ii) including the first instruction and the second instruction in the at least one prompt. For example, the large language model can be used to both classify a user input and generate a query execution plan. However, if the performance data for the large language model falls outside of a desired range, the large language model may be used for one but both of these tasks.

In some implementations, configuring the at least one prompt includes configuring at least one instruction to cause the large language model to (i) determine an order of execution for the set of functions based on at least one of a structured representation of the first query or function dependency data included in the at least one third instruction, and (ii) include the order of execution in the plan. For example, the order of execution can include using the output of one function as an input to another function.

In some implementations, providing the response includes retrieving, via execution of the plan, at least one of: at least one job search result related to the first query; at least one job candidate search result related to the first query; at least one entity profile page related to the first query (e.g., a user profile, business profile, or job posting); at least one blog page related to the first query (e.g., a help or FAQ page, or a business page, or a rankings page); at least one learning content item related to the first query (e.g., tutorial or coaching pages, learning videos, podcasts); or at least one recommendation to improve the first query (e.g., insights for how to modify the query to improve the search results, based on historical data). The type of response provided can vary based on the type of information retrieval system being used or the type of query requested by the user.

In some implementations, providing the response includes providing at least one command to at least one of: modify a component of the user interface as a result of execution of the plan; navigate to a content item or component via the user interface as a result of execution of the plan; populate a component of the user interface with information obtained as a result of execution of the plan; store information created at the user interface as a result of execution of the plan; send an electronic communication to at least one second user of the application identified as a result of execution of the plan (e.g., a connection request, instant message, or email); or schedule an action to be performed by the application as a result of execution of the plan (e.g., a reminder, notification, or report). For example, the response can include one or more commands that cause the user interface to perform an action, alone or in combination with information or search results.

In some implementations, executing the plan includes executing at least one function to at least one of: retrieve entity data related to the first query using a taxonomy; retrieve entity data related to the first query using an entity graph (e.g., traverse the graph to identify relevant companies, schools, skills, locations, job titles, industries); execute a client application command related to the first query (e.g., navigate to a draft the user just created, fill in a field with generated content, apply a search suggestion to a query); execute a server command related to the first query (e.g., archive content items, send an email to a job candidate, schedule a report to be sent on a certain day at a certain time); cause a generative model to generate and output content related to the first query; join data obtained from two or more data resources, e.g. join data obtained from an application with a recommendation or insight; or cause a generative model to generate and output at least one embedding related to the first query. For example, the library of available functions can include many different types of functions that may be involved in query planning and/or query execution.

The examples shown in FIG. 7B and the accompanying description, above are provided for illustration purposes. This disclosure is not limited to the described examples.

FIG. 8 is a block diagram of an example computer system including components of a dynamic query planning system in accordance with some embodiments of the present disclosure.

In FIG. 8, an example machine of a computer system 800 is shown, within which a set of instructions for causing the machine to perform any of the methodologies discussed herein can be executed. In some embodiments, the computer system 800 can correspond to a component of a networked computer system (e.g., as a component of the computing system 100 of FIG. 1A or the computer system 600 of FIG. 6) that includes, is coupled to, or utilizes a machine to execute an operating system to perform operations corresponding to one or more components of the dynamic query planning system 110 of FIG. 1A or the dynamic query planning system 680 of FIG. 6. For example, computer system 800 corresponds to a portion of computing system 600 when the computing system is executing a portion of dynamic query planning system 110 or dynamic query planning system 680.

The machine is connected (e.g., networked) to other machines in a network, such as a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a memory 803 (e.g., flash memory, static random access memory (SRAM), etc.), an input/output system 810, and a data storage system 840, which communicate with each other via a bus 830.

Processing device 802 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be at least one special-purpose processing device such as an application specific integrated circuit (ASIC), a field programmable gate array (FPGA), a digital signal processor (DSP), network processor, or the like. The processing device 802 is configured to execute instructions 812 for performing the operations and steps discussed herein.

In some embodiments of FIG. 8, dynamic query planning system 850 represents portions of dynamic query planning system 680 while the computer system 800 is executing those portions of dynamic query planning system 680. Instructions 812 include portions of dynamic query planning system 850 when those portions of the dynamic query planning system 850 are being executed by processing device 802. Thus, the dynamic query planning system 850 is shown in dashed lines as part of instructions 812 to illustrate that, at times, portions of the dynamic query planning system 850 are executed by processing device 802. For example, when at least some portion of the dynamic query planning system 850 is embodied in instructions to cause processing device 802 to perform the method(s) described herein, some of those instructions can be read into processing device 802 (e.g., into an internal cache or other memory) from main memory 804 and/or data storage system 840. However, it is not required that all of the dynamic query planning system 850 be included in instructions 812 at the same time and portions of the dynamic query planning system 850 are stored in at least one other component of computer system 800 at other times, e.g., when at least one portion of the dynamic query planning system 850 are not being executed by processing device 802.

The computer system 800 further includes a network interface device 808 to communicate over the network 820. Network interface device 808 provides a two-way data communication coupling to a network. For example, network interface device 808 can be an integrated-services digital network (ISDN) card, cable modem, satellite modem, or a modem to provide a data communication connection to a corresponding type of telephone line. As another example, network interface device 808 can be a local area network (LAN) card to provide a data communication connection to a compatible LAN. Wireless links can also be implemented. In any such implementation network interface device 808 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 800.

Computer system 800 can send messages and receive data, including program code, through the network(s) and network interface device 808. In the Internet example, a server can transmit a requested code for an application program through the Internet and network interface device 808. The received code can be executed by processing device 802 as it is received, and/or stored in data storage system 840, or other non-volatile storage for later execution.

The input/output system 810 includes an output device, such as a display, for example a liquid crystal display (LCD) or a touchscreen display, for displaying information to a computer user, or a speaker, a haptic device, or another form of output device. The input/output system 810 can include an input device, for example, alphanumeric keys and other keys configured for communicating information and command selections to processing device 802. An input device can, alternatively or in addition, include a cursor control, such as a mouse, a trackball, or cursor direction keys for communicating direction information and command selections to processing device 802 and for controlling cursor movement on a display. An input device can, alternatively or in addition, include a microphone, a sensor, or an array of sensors, for communicating sensed information to processing device 802. Sensed information can include voice commands, audio signals, geographic location information, haptic information, and/or digital imagery, for example.

The data storage system 840 includes a machine-readable storage medium 842 (also known as a computer-readable medium) on which is stored at least one set of instructions 844 or software embodying any of the methodologies or functions described herein. The instructions 844 can also reside, completely or at least partially, within the main memory 804 and/or within the processing device 802 during execution thereof by the computer system 800, the main memory 804 and the processing device 802 also constituting machine-readable storage media. In one embodiment, the instructions 844 include instructions to implement functionality corresponding to a dynamic query planning system 850 (e.g., the dynamic query planning system 110 of FIG. 1A or dynamic query planning system 680 of FIG. 6).

Dashed lines are used in FIG. 8 to indicate that it is not required that the dynamic query planning system be embodied entirely in instructions 812, 814, and 844 at the same time. In one example, portions of the dynamic query planning system are embodied in instructions 814, which are read into main memory 804 as instructions 814, and portions of instructions 812 are read into processing device 802 as instructions 812 for execution. In another example, some portions of the dynamic query planning system are embodied in instructions 844 while other portions are embodied in instructions 814 and still other portions are embodied in instructions 812.

While the machine-readable storage medium 842 is shown in an example embodiment to be a single medium, the term "machine-readable storage medium" should be taken to include a single medium or multiple media that store the instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media. The examples shown in FIG. 8 and the accompanying description, above are provided for illustration purposes. This disclosure is not limited to the described examples.

Some portions of the preceding detailed description have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100 or the computing system 600, can carry out the above-described computer-implemented methods in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The techniques described herein may be implemented with privacy safeguards to protect user privacy. Furthermore, the techniques described herein may be implemented with user privacy safeguards to prevent unauthorized access to personal data and confidential data. The training of the AI models described herein is executed to benefit all users fairly, without causing or amplifying unfair bias.

According to some embodiments, the techniques for the models described herein do not make inferences or predictions about individuals unless requested to do so through an input. According to some embodiments, the models described herein do not learn from and are not trained on user data without user authorization. In instances where user data is permitted and authorized for use in AI features and tools, it is done in compliance with a user's visibility settings, privacy choices, user agreement and descriptions, and the applicable law. According to the techniques described herein, users may have full control over the visibility of their content and who sees their content, as is controlled via the visibility settings. According to the techniques described herein, users may have full control over the level of their personal data that is shared and distributed between different AI platforms that provide different functionalities.

According to the techniques described herein, users may have full control over the level of access to their personal data that is shared with other parties. According to the techniques described herein, personal data provided by users may be processed to determine prompts when using a generative AI feature at the request of the user, but not to train generative AI models. In some embodiments, users may provide feedback while using the techniques described herein, which may be used to improve or modify the platform and products. In some embodiments, any personal data associated with a user, such as personal information provided by the user to the platform, may be deleted from storage upon user request. In some embodiments, personal information associated with a user may be permanently deleted from storage when a user deletes their account from the platform.

According to the techniques described herein, personal data may be removed from any training dataset that is used to train AI models. The techniques described herein may utilize tools for anonymizing member and customer data. For example, user's personal data may be redacted and minimized in training datasets for training AI models through delexicalization tools and other privacy enhancing tools for safeguarding user data. The techniques described herein may minimize use of any personal data in training AI models, including removing and replacing personal data. According to the techniques described herein, notices may be communicated to users to inform how their data is being used and users are provided controls to opt-out from their data being used for training AI models.

According to some embodiments, tools are used with the techniques described herein to identify and mitigate risks associated with AI in all products and AI systems. In some embodiments, notices may be provided to users when AI tools are being used to provide features.

Illustrative examples of the technologies disclosed herein are provided below. An embodiment of the technologies may include any of the examples described herein, or any combination of any of the examples described herein, or any combination of any portions of the examples described herein.

In an example 1, a method includes: receiving, via a user interface of an application, a first query including a user request for information retrievable using a first set of data resources, the first query including at least one first query term; configuring at least one prompt to cause a large language model to (i) translate the at least one first query term into a set of functions that can be executed to obtain at least one second query term using a second set of data resources, the at least one second query term related to and different from the at least one first query term, and (ii) generate and output a plan that is executable to create a modified version of the first query based on the at least one second query term, the plan including the set of functions configured by the large language model to obtain the at least one second query term using the set of second data resources; applying the large language model to the at least one prompt to obtain the plan; executing the plan generated and output by the large language model to (i) determine the at least one second query term, and (ii) create the modified version of the first query based on the at least one second query term; and executing the modified version of the first query based on the at least one second query term to provide, via the user interface, a response to the first query.

An example 2 includes the subject matter of example 1, further including: configuring the at least one prompt to cause the large language model to select at least one data resource of the second set of data resources based on the first query term and configure at least one function of the set of functions to obtain the at least one second query term from the selected at least one data resource. An example 3 includes the subject matter of example 1 or example 2, further including: assigning different weights to at least first and second data resources of the second set of data resources based on at least one of metadata or performance data or feedback associated with the at least first and second data resources, and configuring the at least one prompt to cause the large language model to (i) select a data resource of the at least first and second data resources based on the weights, and (ii) configure at least one function of the set of functions to obtain the at least one second query term from the selected data resource. An example 4 includes the subject matter of any of examples 1-3, further including: determining whether the first query translates to a plurality of functions; and responsive to determining that the first query translates to the plurality of functions, formulating the modified version of the first query using the plan obtained from the large language model; or responsive to determining that the first query does not translate to the plurality of functions, skipping the configuring, the applying, the executing the plan, and the executing the modified version of the first query. An example 5 includes the subject matter of any of examples 1-4, further including: determining a value of at least one performance metric associated with the large language model; and responsive to determining that the value of the at least one performance metric exceeds a maximum threshold value or does not exceed a minimum threshold value, configuring the at least one prompt to reduce at least one of the number of prompts contained in the at least one prompt or the number of communications with the large language model to obtain the plan or the number of instructions included in the at least one prompt to obtain the plan. An example 6 includes the subject matter of any of examples 1-5, further including, iteratively: obtaining context data associated with at least one of the user request or the response, the context data including data relating to at least one of: a state of the user interface, a state of the application, configuration data associated with a client device running the user interface, a current use of the application by a user, historical use of the application, profile data associated with the user, activity data associated with the user, data extracted from an entity graph, usage statistics associated with at least one of the user interface or the application, or performance data associated with at least one of the user interface, the application, the set of second data resources, or the large language model; modifying the at least one prompt based on the context data to include at least one instruction to cause the large language model to generate and output a modified version of the plan, the modified version of the plan executable to formulate at least one natural language recommendation for modifying the first query; applying the large language model to the modified at least one prompt to obtain, from the large language model, the modified version of the plan; executing the modified version of the plan to obtain the at least one natural language recommendation for modifying the first query; and providing, via the user interface, the at least one natural language recommendation for modifying the query. An example 7 includes the subject matter of any of examples 1-6, where configuring the at least one prompt further includes configuring at least one instruction to identify a plurality of functions related to context data associated with at least one of the user interface or the application and cause the large language model to select the set of functions from the plurality of functions based on the context data associated with at least one of the user interface or the application. An example 8 includes the subject matter of any of examples 1-7, where configuring the at least one prompt further includes: determining a value of at least one performance metric associated with the large language model; and responsive to determining that the value of the at least one performance metric does not exceed a maximum threshold value or exceeds a minimum threshold value, (i) configuring a first instruction to cause the large language model to translate the first query into a structured representation of the first query, (i) configuring a second instruction to cause the large language model to generate the plan based on the structured representation of the first query, and (ii) including the first instruction and the second instruction in the at least one prompt. An example 9 includes the subject matter of any of examples 1-8, where configuring the at least one prompt further includes: configuring at least one instruction to cause the large language model to (i) determine an order of execution for the set of functions based on at least one of a structured representation of the first query or function dependency data, and (ii) include the order of execution in the plan. An example 10 includes the subject matter of any of examples 1-9, where providing the response further includes retrieving, via execution of the plan, at least one of: at least one job search result related to the first query; at least one job candidate search result related to the first query; at least one entity profile page related to the first query; at least one blog page related to the first query; at least one learning content item related to the first query; or at least one recommendation to improve the first query. An example 11 includes the subject matter of any of examples 1-10, where providing the response further includes providing at least one command to at least one of: modify a component of the user interface as a result of execution of the plan; navigate to a content item or component via the user interface as a result of execution of the plan; populate a component of the user interface with information obtained as a result of execution of the plan; store information created at the user interface as a result of execution of the plan; send an electronic communication to at least one second user of the application identified as a result of execution of the plan; or schedule an action to be performed by the application as a result of execution of the plan. An example 12 includes the subject matter of any of examples 1-11, where executing the plan includes executing at least one function to at least one of: retrieve entity data related to the first query using a taxonomy; retrieve entity data related to the first query using an entity graph; execute a client application command related to the first query; execute a server command related to the first query; cause a generative model to generate and output content related to the first query; or cause a generative model to generate and output at least one embedding related to the first query.

In an example 13, a system includes: at least one processor; and at least one memory coupled to the at least one processor, where the at least one memory includes at least one instruction that, when executed by the at least one processor, cause the at least one processor to perform at least one operation including: receiving, via a user interface of an application, a first query including a user request for information retrievable using a first set of data resources, the first query including at least one first query term; configuring at least one prompt to cause a large language model to (i) translate the at least one first query term into a set of functions that can be executed to obtain at least one second query term using a second set of data resources, the at least one second query term related to and different from the at least one first query term, and (ii) generate and output a plan that is executable to create a modified version of the first query based on the at least one second query term, the plan including the set of functions configured by the large language model to obtain the at least one second query term using the set of second data resources; applying the large language model to the at least one prompt to obtain the plan; executing the plan generated and output by the large language model to (i) determine the at least one second query term, and (ii) create the modified version of the first query based on the at least one second query term; and executing the modified version of the first query based on the at least one second query term to provide, via the user interface, a response to the first query.

An example 14 includes the subject matter of example 13, where the at least one instruction, when executed by the at least one processor, causes the at least one processor to perform at least one operation further including at least one of: configuring the at least one prompt to cause the large language model to select at least one data resource of the second set of data resources based on the first query term and configure at least one function of the set of functions to obtain the at least one second query term from the selected at least one data resource; or configuring the at least one prompt to cause the large language model to assign different weights to at least first and second data resources of the second set of data resources based on at least one of metadata or performance data associated with the at least first and second data resources, select a data resource of the at least first and second data resources based on the weights, and configure at least one function of the set of functions to obtain the at least one second query term from the selected data resource. An example 15 includes the subject matter of example 13 or example 14, where the at least one instruction, when executed by the at least one processor, causes the at least one processor to perform at least one operation further including: determining whether the first query translates to a plurality of functions; and responsive to determining that the first query translates to the plurality of functions, formulating the modified version of the first query using the plan obtained from the large language model; or responsive to determining that the first query does not translate to the plurality of functions, skipping the configuring, the applying, the executing the plan, and the executing the modified version of the first query. An example 16 includes the subject matter of any of examples 13-15, where the at least one instruction, when executed by the at least one processor, causes the at least one processor to perform at least one operation further including, iteratively: obtaining context data associated with at least one of the user request or the response, the context data including data relating to at least one of: a state of the user interface, a state of the application, a current use of the application by a user, historical use of the application, profile data associated with the user, activity data associated with the user, data extracted from an entity graph, usage statistics associated with at least one of the user interface or the application, or performance data associated with at least one of the user interface, the application, the set of second data resources, or the large language model; configuring at least one second prompt based on the context data, the at least one second prompt including at least one instruction to cause the large language model to generate and output a second plan executable to formulate at least one recommendation for modifying the first query; applying the large language model to the at least one second prompt to obtain, from the large language model, the second plan including a second set of functions configured by the large language model to formulate the at least one recommendation for modifying the first query; executing the second plan to obtain the at least one recommendation for modifying the query; and providing, via the user interface, a second response to the first query, the second response including the at least one recommendation for modifying the query.

In an example 17, at least one non-transitory machine-readable storage medium including at least one instruction that, when executed by at least one processor, causes the at least one processor to perform at least one operation including: receiving, via a user interface of an application, a first query including a user request for information retrievable using a first set of data resources, the first query including at least one first query term; configuring at least one prompt to cause a large language model to (i) translate the at least one first query term into a set of functions that can be executed to obtain at least one second query term using a second set of data resources, the at least one second query term related to and different from the at least one first query term, and (ii) generate and output a plan that is executable to create a modified version of the first query based on the at least one second query term, the plan including the set of functions configured by the large language model to obtain the at least one second query term using the set of second data resources; applying the large language model to the at least one prompt to obtain the plan; executing the plan generated and output by the large language model to (i) determine the at least one second query term, and (ii) create the modified version of the first query based on the at least one second query term; and executing the modified version of the first query based on the at least one second query term to provide, via the user interface, a response to the first query. An example 18 includes the subject matter of example 17, where configuring the at least one prompt further includes configuring at least one instruction to identify a plurality of functions related to context data associated with at least one of the user interface or the application and cause the large language model to select the set of functions from the plurality of functions based on context data associated with at least one of the user interface, the application, the set of second data resources, or the first query. An example 19 includes the subject matter of example 17 or example 18, where configuring the at least one prompt further includes: determining a value of at least one performance metric associated with the large language model; and responsive to determining that the value of the at least one performance metric does not exceed a threshold value, (i) configuring a first instruction to cause the large language model to translate the first query into a structured representation of the first query, (i) configuring a second instruction to cause the large language model to generate the plan based on the structured representation of the first query, and (ii) including the first instruction and the second instruction in the at least one prompt. An example 20 includes the subject matter of any of examples 17-19, where configuring the at least one prompt further includes configuring at least one instruction to cause the large language model to (i) determine an order of execution for the set of functions based on at least one of a structured representation of the first query or function dependency data, and (ii) include the order of execution in the plan.

An example 21 includes the method of any of the preceding examples, further including any one or more aspects, steps, components, elements, processes, or limitations that are at least one of described in the enclosed description or shown in the accompanying drawings. An example 22 includes a system, including: at least one processor; and at least one memory coupled to the at least one processor, where the at least one memory includes instructions that, when executed by the at least one processor, cause the at least one processor to perform at least one operation including the method of any of examples 1-21. An example 23 includes at least one non-transitory machine-readable storage medium, including instructions that, when executed by at least one processor, cause the at least one processor to perform at least one operation including the method of any of examples 1-21.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving, via a user interface of an application, a first query comprising a user request for information retrievable using a first set of data resources, the first query comprising at least one first query term;
configuring, by a processor, at least one prompt to cause a generative machine learning model to (i) translate the at least one first query term into a set of functions that can be executed to obtain at least one second query term using a second set of data resources, the at least one second query term related to the at least one first query term and different from the at least one first query term, and (ii) generate and output a plan that is executable to create a modified version of the first query based on the at least one second query term, the plan comprising the set of functions configured by the generative machine learning model to obtain the at least one second query term using the second set of data resources that is different from the first set of data resources;
applying, by the processor, the generative machine learning model to the configured at least one prompt;
executing, by the processor, the plan generated and outputted by the generative machine learning model to (i) determine the at least one second query term, and (ii) create the modified version of the first query based on the at least one second query term;
executing the modified version of the first query based on the at least one second query term to provide, via the user interface, a response to the first query; and
responsive to determining that a value of at least one performance metric for the generative machine learning model meets or exceeds a maximum threshold value or is less than or equal to a minimum threshold value, configuring the at least one prompt to reduce at least one of: a number of prompts contained in the at least one prompt, or a number of communications with the generative machine learning model to obtain the plan, or a number of instructions included in the at least one prompt.

2. The method of claim 1, further comprising:
configuring the at least one prompt to cause the generative machine learning model to select at least one data resource of the second set of data resources based on the first query term and configure at least one function of the set of functions to obtain the at least one second query term from the selected at least one data resource.

3. The method of claim 1, further comprising:
assigning different weights to at least first and second data resources of the second set of data resources based on at least one of metadata or performance data or feedback associated with the at least first and second data resources, and configuring the at least one prompt to cause the generative machine learning model to (i) select a data resource of the at least first and second data resources based on the weights, and (ii) configure at least one function of the set of functions to obtain the at least one second query term from the selected data resource.

4. The method of claim 1, further comprising:
determining whether the first query translates to a plurality of functions; and
responsive to determining that the first query translates to the plurality of functions, formulating the modified version of the first query using the plan obtained from the generative machine learning model; or
responsive to determining that the first query does not translate to the plurality of functions, skipping the configuring at least one prompt, the applying, the executing the plan, and the executing the modified version of the first query.

5. The method of claim 1, further comprising, iteratively:
obtaining context data associated with at least one of the user request or the response, the context data comprising data relating to at least one of: a state of the user interface, a state of the application, configuration data associated with a client device running the user interface, a current use of the application by a user, historical use of the application, profile data associated with the user, activity data associated with the user, data extracted from an entity graph, usage statistics associated with at least one of the user interface or the application, or performance data associated with at least one of the user interface, the application, the second set of data resources, or the generative machine learning model;
modifying the at least one prompt based on the context data to include at least one instruction to cause the generative machine learning model to generate and output a modified version of the plan, the modified version of the plan executable to formulate at least one natural language recommendation for modifying the first query;
applying the generative machine learning model to the modified at least one prompt to obtain, from the generative machine learning model, the modified version of the plan;
executing the modified version of the plan to obtain the at least one natural language recommendation for modifying the first query; and
providing, via the user interface, the at least one natural language recommendation for modifying the query.

6. The method of claim 1, wherein configuring the at least one prompt further comprises configuring at least one instruction to identify a plurality of functions related to context data associated with at least one of the user interface or the application and cause the generative machine learning model to select the set of functions from the plurality of functions based on the context data associated with at least one of the user interface or the application.

7. The method of claim 1, wherein configuring the at least one prompt further comprises:
responsive to determining that the value of the at least one performance metric does not exceed a maximum threshold value or exceeds a minimum threshold value, (i) configuring a first instruction to cause the generative machine learning model to translate the first query into a structured representation of the first query, (i) configuring a second instruction to cause the generative machine learning model to generate the plan based on the structured representation of the first query, and (ii) including the first instruction and the second instruction in the at least one prompt.

8. The method of claim 1, wherein configuring the at least one prompt further comprises:
configuring at least one instruction to cause the generative machine learning model to (i) determine an order of execution for the set of functions based on at least one of a structured representation of the first query or function dependency data, and (ii) include the order of execution in the plan.

9. The method of claim 1, wherein providing the response further comprises retrieving, via execution of the plan, at least one of:
at least one job search result related to the first query;
at least one job candidate search result related to the first query;
at least one entity profile page related to the first query;
at least one blog page related to the first query;
at least one learning content item related to the first query; or
at least one recommendation to improve the first query.

10. The method of claim 1, wherein providing the response further comprises providing at least one command to at least one of:
modify a component of the user interface as a result of execution of the plan;
navigate to a content item or component via the user interface as a result of execution of the plan;
populate a component of the user interface with information obtained as a result of execution of the plan;
store information created at the user interface as a result of execution of the plan;
send an electronic communication to at least one second user of the application identified as a result of execution of the plan; or
schedule an action to be performed by the application as a result of execution of the plan.

11. The method of claim 1, wherein executing the plan comprises executing at least one function to at least one of:
retrieve entity data related to the first query using a taxonomy;
retrieve entity data related to the first query using an entity graph;
execute a client application command related to the first query;
execute a server command related to the first query;
cause a generative model to generate and output content related to the first query; or
cause a generative model to generate and output at least one embedding related to the first query.

12. A system comprising:
at least one processor; and
at least one memory coupled to the at least one processor, wherein the at least one memory comprises at least one instruction that, when executed by the at least one processor, cause the at least one processor to perform at least one operation comprising:
receiving, via a user interface of an application, a first query comprising a user request for information retrievable using a first set of data resources, the first query comprising at least one first query term;
configuring at least one prompt to cause a generative machine learning model to (i) translate the at least one first query term into a set of functions that can be executed to obtain at least one second query term using a second set of data resources, the at least one second query term related to the at least one first query term and different from the at least one first query term, and (ii) generate and output a plan that is executable to create a modified version of the first query based on the at least one second query term, the plan comprising the set of functions configured by the generative machine learning model to obtain the at least one second query term using the second set of data resources that is different from the first set of data resources;

applying the generative machine learning model to the configured at least one prompt;

executing the plan generated and outputted by the generative machine learning model to (i) determine the at least one second query term, and (ii) create the modified version of the first query based on the at least one second query term;

executing the modified version of the first query based on the at least one second query term to provide, via the user interface, a response to the first query; and responsive to determining that a value of at least one performance metric for the generative machine learning model meets or exceeds a maximum threshold value or is less than or equal to a minimum threshold value, configuring the at least one prompt to reduce at least one of: a number of prompts contained in the at least one prompt, or a number of communications with the generative machine learning model to obtain the plan, or a number of instructions included in the at least one prompt.

13. The system of claim 12, wherein the at least one instruction, when executed by the at least one processor, causes the at least one processor to perform at least one operation further comprising at least one of:

configuring the at least one prompt to cause the generative machine learning model to select at least one data resource of the second set of data resources based on the first query term and configure at least one function of the set of functions to obtain the at least one second query term from the selected at least one data resource; or configuring the at least one prompt to cause the generative machine learning model to assign different weights to at least first and second data resources of the second set of data resources based on at least one of metadata or performance data associated with the at least first and second data resources, select a data resource of the at least first and second data resources based on the weights, and configure at least one function of the set of functions to obtain the at least one second query term from the selected data resource.

14. The system of claim 12, wherein the at least one instruction, when executed by the at least one processor, causes the at least one processor to perform at least one operation further comprising:

determining whether the first query translates to a plurality of functions; and responsive to determining that the first query translates to the plurality of functions, formulating the modified version of the first query using the plan obtained from the generative machine learning model; or responsive to determining that the first query does not translate to the plurality of functions, skipping the configuring at least one prompt, the applying, the executing the plan, and the executing the modified version of the first query.

15. The system of claim 12, wherein the at least one instruction, when executed by the at least one processor, causes the at least one processor to perform at least one operation further comprising, iteratively:

obtaining context data associated with at least one of the user request or the response, the context data comprising data relating to at least one of: a state of the user interface, a state of the application, a current use of the application by a user, historical use of the application, profile data associated with the user, activity data associated with the user, data extracted from an entity graph, usage statistics associated with at least one of the user interface or the application, or performance data associated with at least one of the user interface, the application, the set of second data resources, or the generative machine learning model;

configuring at least one second prompt based on the context data, the at least one second prompt including at least one instruction to cause the generative machine learning model to generate and output a second plan executable to formulate at least one recommendation for modifying the first query;

applying the generative machine learning model to the at least one second prompt to obtain, from the generative machine learning model, the second plan comprising a second set of functions configured by the generative machine learning model to formulate the at least one recommendation for modifying the first query;

executing the second plan to obtain the at least one recommendation for modifying the query; and providing, via the user interface, a second response to the first query, the second response comprising the at least one recommendation for modifying the query.

16. At least one non-transitory machine-readable storage medium comprising at least one instruction that, when executed by at least one processor, causes the at least one processor to perform at least one operation comprising:

receiving, via a user interface of an application, a first query comprising a user request for information retrievable using a first set of data resources, the first query comprising at least one first query term;

configuring at least one prompt to cause a generative machine learning model to (i) translate the at least one first query term into a set of functions that can be executed to obtain at least one second query term using a second set of data resources, the at least one second query term related to the at least one first query term and different from the at least one first query term, and (ii) generate and output a plan that is executable to create a modified version of the first query based on the at least one second query term, the plan comprising the set of functions configured by the generative machine learning model to obtain the at least one second query term using the second set of data resources that is different from the first set of data resources;

applying the generative machine learning model to the configured at least one prompt;

executing the plan generated and outputted by the generative machine learning model to (i) determine the at least one second query term, and (ii) create the modified version of the first query based on the at least one second query term;

executing the modified version of the first query based on the at least one second query term to provide, via the user interface, a response to the first query; and responsive to determining that a value of at least one performance metric for the generative machine learning model meets or exceeds a maximum threshold value or is less than or equal to a minimum threshold value, configuring the at least one prompt to reduce at least one of: a number of prompts contained in the at least one prompt, or a number of communications with the generative machine learning model to obtain the plan, or a number of instructions included in the at least one prompt.

17. The at least one non-transitory machine-readable storage medium of claim 16, wherein configuring the at least one prompt further comprises configuring at least one instruction to identify a plurality of functions related to context data associated with at least one of the user interface or the application and cause the generative machine learning model to select the set of functions from the plurality of functions based on context data associated with at least one of the user interface, the application, the set of second data resources, or the first query.

18. The at least one non-transitory machine-readable storage medium of claim 16, wherein configuring the at least one prompt further comprises:

responsive to determining that the value of the at least one performance metric does not exceed a threshold value, (i) configuring a first instruction to cause the generative machine learning model to translate the first query into a structured representation of the first query, (i) configuring a second instruction to cause the generative machine learning model to generate the plan based on the structured representation of the first query, and (ii) including the first instruction and the second instruction in the at least one prompt.

19. The at least one non-transitory machine-readable storage medium of claim 16, wherein configuring the at least one prompt further comprises configuring at least one instruction to cause the generative machine learning model to (i) determine an order of execution for the set of functions based on at least one of a structured representation of the first query or function dependency data, and (ii) include the order of execution in the plan.

* * * * *